(12) United States Patent
Shan et al.

(10) Patent No.: US 10,049,147 B2
(45) Date of Patent: Aug. 14, 2018

(54) METHOD, APPARATUS AND TERMINAL FOR PROCESSING DOCUMENTS

(71) Applicant: Tencent Technology (Shenzhen) Co., Ltd., Shenzhen, Guangdong (CN)

(72) Inventors: Yi Shan, Guangdong (CN); Bin Zhang, Guangdong (CN); Likai Wang, Guangdong (CN); Zhiyuan Lin, Guangdong (CN); Zhuo Tang, Guangdong (CN); Liang Wu, Guangdong (CN); Ling Li, Guangdong (CN); Kai Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 876 days.

(21) Appl. No.: 14/581,669

(22) Filed: Dec. 23, 2014

(65) Prior Publication Data

US 2015/0120654 A1 Apr. 30, 2015

Related U.S. Application Data

(63) Continuation of application No. PCT/CN2014/077865, filed on May 20, 2014.

(30) Foreign Application Priority Data

Sep. 30, 2013 (CN) .......................... 2013 1 0465673

(51) Int. Cl.
*G06F 17/22* (2006.01)
*G06F 17/30* (2006.01)
*G06F 17/27* (2006.01)

(52) U.S. Cl.
CPC .... *G06F 17/30581* (2013.01); *G06F 17/2235* (2013.01); *G06F 17/2705* (2013.01)

(58) Field of Classification Search
CPC ............. G06F 17/2235; G06F 17/2705; G06F 17/30581
See application file for complete search history.

(56) References Cited

U.S. PATENT DOCUMENTS 5,860,073 A 1/1999 Ferrel et al.
7,631,254 B2 * 12/2009 Layard ................ G06F 17/3089
434/118

(Continued)

FOREIGN PATENT DOCUMENTS

CN 101882075 A 11/2010
CN 102799592 A 11/2012

(Continued)

OTHER PUBLICATIONS

CN103064975 description english machine translation.*

(Continued)

*Primary Examiner* — Scott Baderman
*Assistant Examiner* — Mario M Velez-Lopez
(74) *Attorney, Agent, or Firm* — Brinks Gilson & Lione

(57) ABSTRACT

A method and apparatus for processing documents have been presented. The method includes: upon receiving an operation request for a designated document, obtaining constituent information of the designated document, wherein the constituents information comprises a first resource identification of at least one multimedia resource; obtaining, according to the first resource identification of the at least one multimedia resource, the at least one multimedia resource and a location of the at least one multimedia resource within the designated document; obtaining the designated document according to the at least one multimedia resource and the location of the at least one multimedia resource within the designated document; and loading and displaying in sequence, the at least one multimedia resource which constitutes the designated document, according to a (Continued)

resource loading sequence which is determined by the designated document.

52 Claims, 10 Drawing Sheets

(56) References Cited

U.S. PATENT DOCUMENTS

| | | | | |
|---|---|---|---|---|
| 9,311,618 | B2* | 4/2016 | Lieb | G06Q 10/10 |
| 9,961,386 | B1* | 5/2018 | Thomas | H04N 21/26258 |
| 2003/0229845 | A1* | 12/2003 | Salesin | G06F 17/30905 |
| | | | | 715/249 |
| 2006/0020645 | A1* | 1/2006 | Hasegawa | G06F 17/30067 |
| 2011/0246440 | A1* | 10/2011 | Kocks | G06F 17/30781 |
| | | | | 707/706 |
| 2014/0281918 | A1* | 9/2014 | Wei | H04L 67/02 |
| | | | | 715/234 |
| 2015/0058713 | A1* | 2/2015 | Fan | G06Q 50/01 |
| | | | | 715/234 |
| 2015/0120654 | A1* | 4/2015 | Shan | G06F 17/2235 |
| | | | | 707/610 |
| 2016/0098783 | A1* | 4/2016 | Margalit | G06Q 30/0635 |
| | | | | 705/26.5 |

FOREIGN PATENT DOCUMENTS

| | | |
|---|---|---|
| CN | 103064975 A | 4/2013 |
| CN | 103186370 A | 7/2013 |

OTHER PUBLICATIONS

Varvy.com "Prioritize visible content", Feb. 13 https://web.archive.org/web/20160213094528/https://varvy.com/pagespeed/prioritize-visible-content.html.*

Wordpress.org, "Adding Files for Download", Jan. 20, 2013 https://make.wordpress.org/support/user-manual/content/media/adding-media-to-your-pages-and-posts/adding-files-for-download/.*

Office Action dated Jun. 28, 2017 for Chinese Application No. 201310465673.X, 9 pages.

International Search Report received in PCT Application No. PCT/CN2014/077865 dated Aug. 27, 2014.

* cited by examiner

METHOD, APPARATUS AND TERMINAL FOR PROCESSING DOCUMENTS

CROSS-REFERENCE TO RELATED APPLICATIONS

The application is a continuation of PCT Application No. PCT/CN2014/077865, filed on May 20, 2014, which claims priority to Chinese Patent Application No. 201310465673X, filed on Sep. 30, 2013, which is incorporated by reference in their entireties.

FIELD OF THE TECHNOLOGY

The disclosure belongs to the field of Internet technology; to a method, apparatus and terminal for processing documents.

BACKGROUND

With the development of the computer technology, document type is no longer limited to plain text format. Rather current document types may be of Rich Text Format with multimedia resources which may be recorded and presented in one rich text format document. Hypertext Markup Language (HTML) is one of such rich text formats. The resources with different forms, such as text, pictures, voice, video, file and reference to other page layout may be recorded within one single document via HTML. The exhibition formats are rich enough to satisfy users' different needs.

In the process of completing the present disclosure, the inventors find that the prior arts at least have the following problems: the plain text format is limited due to its single presenting form, while the rich text format although exhibits various exhibition formats, it is still necessary to load and render the whole document for display, which results in a slow loading rate that cause inconvenience to users.

SUMMARY

An embodiment of the present disclosure has provided a method for processing documents or playing media data of the document on a terminal, the method including: upon receiving an operation request for a designated document, obtaining constituent information of the designated document, wherein the constituents information comprises a first resource identification of at least one multimedia resource; obtaining, according to the first resource identification of the at least one multimedia resource, the at least one multimedia resource and a location of the at least one multimedia resource within the designated document; obtaining the designated document according to the at least one multimedia resource and the location of the at least one multimedia resource within the designated document; and loading and displaying in sequence, the at least one multimedia resource which constitutes the designated document, according to a resource loading sequence which is determined by the designated document.

Another embodiment of the disclosure discloses an apparatus for process document. The apparatus may include: a constituent information obtaining module, which upon receiving an operation request for a designated document, obtains constituents information of the designated document, wherein the constituents information comprises a first resource identification of at least one multimedia resource; a multimedia resource obtaining module, which obtains according to the first resource identification of the at least one multimedia resource, the at least one multimedia resource and a location of the at least one multimedia resource within the designated document; a designated document obtaining module, which obtains the designated document according to the at least one multimedia resource and the location of the at least one multimedia resource within the designated document; and a loading and displaying module, which loads and displays in sequence, the at least one multimedia resource which constitutes the designated document, according to a resource loading sequence which is determined by the designated document.

The beneficial effects generated by the technical solutions provided by the various embodiments of the present disclosure include: enhancing a loading rate of the document through obtaining a designated document according to multimedia resource and the location of the multimedia resource within the designated document, and then loading and displaying the multimedia resource in sequence according to a resource loading sequence during loading, thereby avoiding a slow loading rate which is caused by the displaying of the document takes place after loading and rendering the whole document.

BRIEF DESCRIPTION OF THE DRAWINGS

The accompanying drawings are included to provide a further understanding of the claims and disclosure, are incorporated in, and constitute a part of this specification. The detailed description and illustrated embodiments described serve to explain the principles defined by the claims.

DETAILED DESCRIPTION OF THE EMBODIMENTS

The various embodiments of the present disclosure are further described in details in combination with attached drawings and embodiments below. It should be understood that the specific embodiments described here are used only to explain the present disclosure, and are not used to limit the present disclosure. In addition, for the sake of keeping description brief and concise, the newly added features, or features that are different from those previously described in each new embodiment will be described in details. Similar features may be referenced back to the prior descriptions in a prior numbered drawing or referenced ahead to a higher numbered drawing.

In order to clarify the object, technical scheme and advantages of the present disclosure more specifically, the present disclosure is illustrated in further details with the accompanied drawings and embodiments. It should be understood that the embodiments described herein are merely examples to illustrate the present disclosure, but not to limit the present disclosure.

Figure 1:
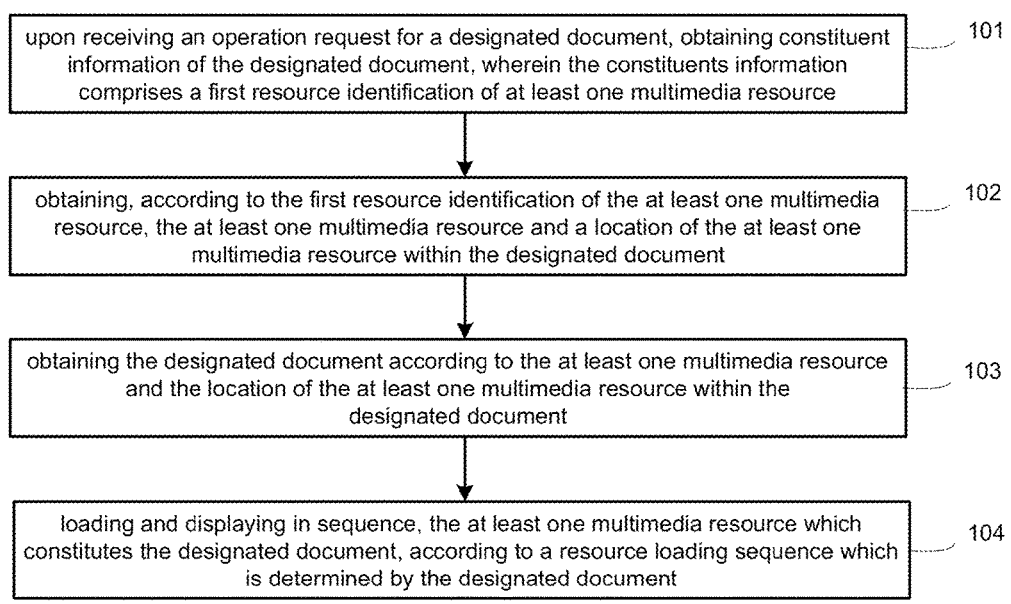
FIG. 1 is a flowchart illustrating an exemplary method for processing documents, according to an embodiment of the disclosure.

FIG. 1 is a flowchart illustrating an exemplary method for processing documents, according to an embodiment of the disclosure. The method may include at least the following exemplary steps:

Step 101: upon receiving an operation request for a designated document, obtaining constituent information of the designated document, wherein the constituents information comprises a first resource identification of at least one multimedia resource.

Step 102: obtaining, according to the first resource identification of the at least one multimedia resource, the at least one multimedia resource and a location of the at least one multimedia resource within the designated.

Step 103: obtaining the designated document according to the at least one multimedia resource and the location of the at least one multimedia resource within the designated document.

Step 104; loading and displaying in sequence, the at least one multimedia resource which constitutes the designated document, according to a resource loading sequence which is determined by the designated document.

The method of the present disclosure enhances a loading rate of the document through first obtaining a designated document according to the multimedia resource and the location in the designated document, afterwards loading and displaying the multimedia resource in sequence according to the multimedia resource loading sequence during loading. Such processing sequence enables avoiding a slow loading rate in current practices which a document is usually displayed only after a completion of loading and rendering of the whole document.

The above embodiments may be executed in any combinations as alternative embodiments to achieve similar advantages, which will not be described one by one herein.

Figure 2:
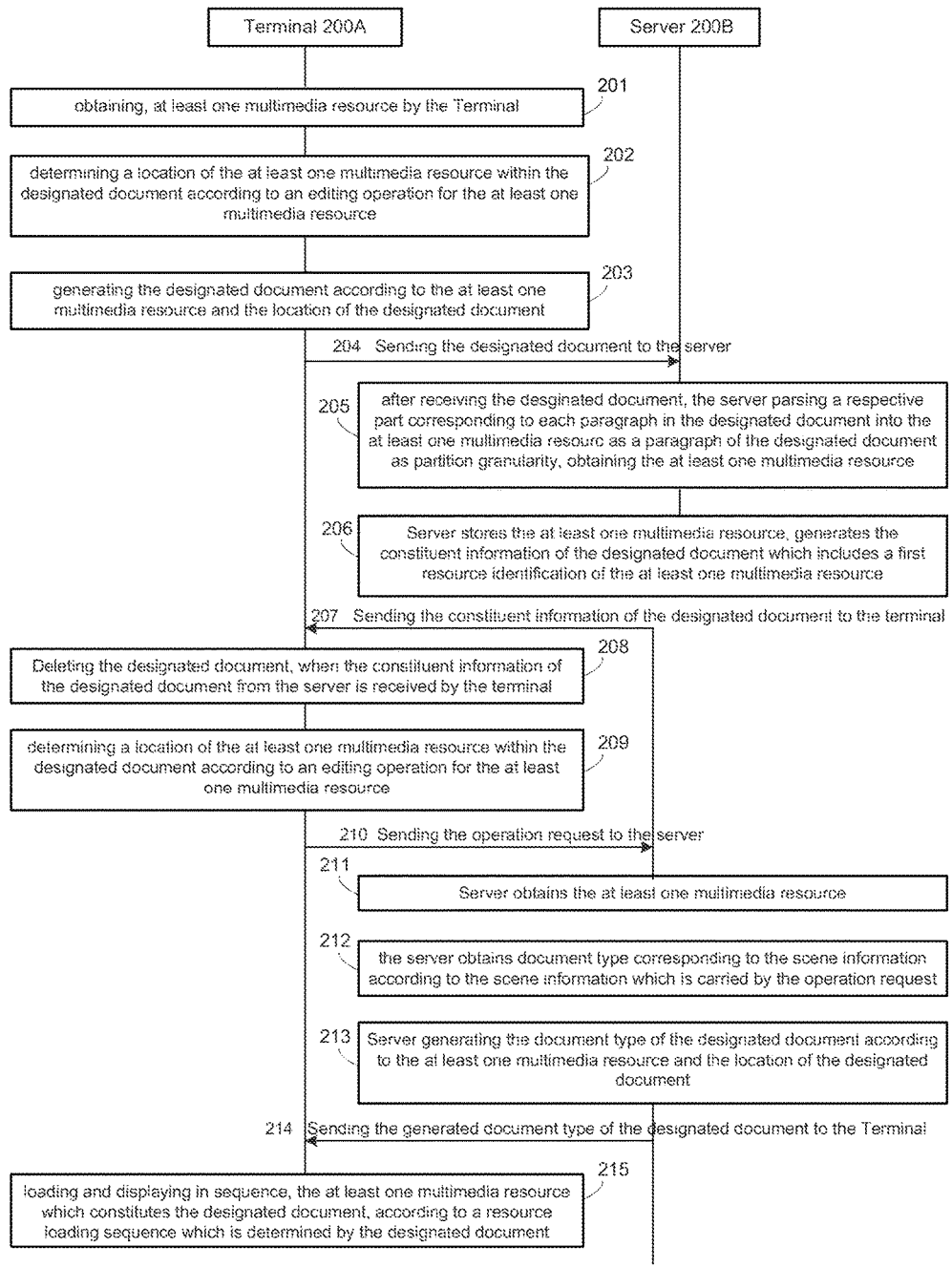
FIG. 2 is a flow chart illustrating an exemplary method for processing documents, according to an embodiment of the disclosure.

FIG. 2 is a flow chart illustrating an exemplary method for processing documents, according to an embodiment of the disclosure. More specifically, FIG. 2 illustrates a method with an interaction between a terminal (200A) and a server (200B), which a designated document may be generated by the terminal (200A).

The exemplary method ray include at least the following steps:

Step 201: obtaining at least one multimedia resource by the terminal, wherein, the at least one multimedia resource may be a resource in the form of text, pictures, web links (such as URL), voice, video, documents, audio files (such as music files in a music application or those obtained by a functional program for searching music files), physical locations, books obtained by a functional program for searching books, reference to other webpage layout and the like. Of course, the at least one multimedia resource is not limited to above mentioned several forms and may also be in other forms, the embodiment of the invention is not particularly limited in this regard.

For the purpose of editing the designated document, the terminal (200A) may provide an editing interface for adding the at least one multimedia resource which constitutes the designated document. In this regard, the at least one multimedia resource obtained may be added by the user in an editing interface. The source of the at least one multimedia resource may be may be network, terminal or cloud server and the like. The at least one multimedia resource may be obtained through adding multimedia resource in various locations in the editing interface by a user in order to generate the designated document.

The obtaining of the at least one multimedia resource from different sources may be is described in detail as follows.

For example, in case if the network is the source of the at least one multimedia resource: during browsing a webpage, the user may copy certain text from the web page or obtain a video link from a video web site, then paste the text or the video link to any location of the editing interface. Alternately, drag the text or video link in the editing interface in order to determine the location in the designated document in order to display the text or the video corresponding to the video link in the corresponding location of the editing interface.

In the case if the terminal is the source of the at least one multimedia resource: the user may select any one multimedia resource from a local storage of the terminal. The multimedia resource may be a video or audio file etc., then paste such selected multimedia resource to any location of the editing interface. Alternately drag the said multimedia resource in the editing interface to determine the location in the designated document in order to display the multimedia resource in the corresponding location of the editing interface.

The multimedia resources are synchronized to a local storage from an instant messaging application, a SNS community or other cloud storage application and the like, which may also be stored in the local storage of the terminal. For such multimedia resources, the user may obtain a list of items from the lists of the instant messaging application, SNS community or other cloud storage application, then paste the list of items to any location of the editing interface. Alternately drag the list terms in the editing interface to determine the location in the designated document in order to display the said multimedia resources in the corresponding location of the editing interface.

It should be noted that, as for the multimedia resource in the aforesaid local storage of the terminal, the local storage path of the multimedia resource may be pasted when pasting to the editing interface, wherein the local storage path may be mapped to the pasted multimedia resource.

In case if a cloud server may be the source of the multimedia resource: for the multimedia resources stored in the cloud server from instant messaging application, SNS community or other cloud storage application etc., the user may obtain list items from the list of instant messaging application, SNS community or other cloud storage application, then paste the list items to any location in the editing interface. Alternately drag the list items in the editing interface to determine the location in the designated document, in order to display the multimedia resources in the corresponding location of the editing interface.

It should be noted that, the multimedia resources in the aforesaid cloud server when pasting to the editing interface, the user may paste the web links corresponding to the multimedia resources, or access the web links to download the multimedia resources and then paste the local storage path to the editing interface after the downloaded multimedia resources are stored in the local storage.

In addition, for the mobile terminal, the content in the editing interface may be shown in a form as paragraphs. Each multimedia resource may form one paragraph so that the layout for displaying the multimedia resources may be clear and orderly. The multimedia resources which are adjacent with each other and which pertain to the same type of resource may be positioned into the same paragraph in order to prevent the multimedia resources from being parsed or parsed into bits and pieces. For example, a plurality of audio files may be displayed side by side. Accordingly, the multimedia resources may be parsed according to paragraphs, so as to obtain groups of multimedia resources during parsing. The groups of multimedia resources may include a plurality of multimedia resources positioned in the same paragraph and there may be certain location relationship between each multimedia resource in the groups.

Step 202: determining a location of the at least one multimedia resource within the designated document according to an editing operation for the at least one multimedia resource.

The editing operation may include pasting, adding, dragging, and the like. Typically, the specific type of the editing operation may depend on a pattern of the editing interface. The location of the multimedia resource in the designated document may include a dependency relationship between such multimedia resource and the other multimedia resource. For example, one audio file may be added into a certain paragraph of text, so that such audio file may have a dependent relationship with that certain paragraph of text. The location of the multimedia resource in the designated document may also include a paragraph of the designated document in which the multimedia resource is positioned.

If the editing interface may be edited by directly adding multimedia resources, then the editing operation may be a pasting operation. The location of the multimedia resource in the designated document after executing the pasting operation may be the location of the multimedia resource in the designated document.

If the editing interface needs to exhibit another interface to select multimedia resource from another interface to add the multimedia resource, the editing operation may be the selecting operation to the multimedia resource. For example, the editing interface may be similar to the interface for adding attachments. The editing interface includes an option for exhibiting other interfaces. When activating the option, the interface for exhibiting the local storage files or favorite list of certain instant messaging application may be displayed. When a user selects one or more multimedia resources in the displayed interface, the editing interface may define the displayed location of the multimedia resources. For example, the editing interface may provide a plurality of borders and a multimedia resource may be pasted into one border. Alternatively, the editing interface may not define the displayed location of the multimedia resource. For example, the editing interface may be a blank interface such that the location of the multimedia resource may be randomly determined by the user's editing operation.

Furthermore, the editing interface may allow the user to drag the obtained multimedia resource and determine the location of the multimedia resource in the designated document in order to satisfy a personalized need. Alternatively, the editing interface may also allow the user to change the display size of the multimedia resource e.g., by dragging the border of the multimedia resource to shrink or expand the display of the multimedia resource.

In reality, the above steps 201 and 202 may be carried out simultaneously. That is to say, once the multimedia resource is obtained, the location of this multimedia resource may be determined. Even though the illustrated method is a stepwise process, the method is not limited to what sequence the steps are executed for obtaining and determining the location.

Step 203: generating the designated document according to the at least one multimedia resource and the location of the designated document. When the at least one multimedia resource location is obtained, the respective component of the designated document may be determined and the respective multimedia resource may be displayed in a respective paragraph of the designated document. In this regard, the designated document may be generated according to the at least one multimedia resource.

Furthermore, words, comments, titles, tables and abstract and the like may be added after obtaining the at least one multimedia resource and the location thereof in the designated document, thus generating designated document. The information such as words, comments, titles, tables and abstract and the like may be used to index the designated document.

Figure 3:
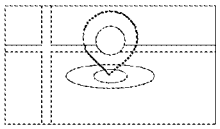
FIG. 3 depicts a display of an exemplary designated document, according to an embodiment of the disclosure.

The following steps may be described in conjunction with FIG. 3, which depicts a display of an exemplary designated document (300) on the terminal (200A), according to an embodiment of the disclosure. As shown in FIG. 3, the designated document (300) being displayed on the terminal (200A) includes text, pictures, audio and physical location information.

Step 204: the terminal (200A) sending the designated document to (300) the server (200B). The designated document (300) may be sent to the server (200B) to insure that the server may obtain each component of the designated document, so that the server may parse and store the designated document (300).

Typically, a resource identification of the at least one multimedia resource may also be sent to the server (200B) to avoid consumption of the transmission time and traffic. In the case if the server (200B) has already stored the multimedia resource with the same resource identification, the multimedia resource except for the stored one among the at least one multimedia resource may be sent to the server. In the case if the server has not stored the multimedia resource with the same resource identification, the at least one multimedia resource is sent to the server (200B), such that the server may store the received multimedia resource as well as its location in the designated document.

As for some multimedia resources which are locally stored in the terminal (200A), the multimedia resources may not be uploaded to the server (200B) as the data volume of the multimedia resource has become larger than the predetermined threshold value, this is to avoid subsequent consumption of traffic. On the other hand, if the multimedia resource with data volume is lower than the predetermined threshold value or the resource identification of multimedia resource is sent to the server, such that the server stores the received multimedia resource and its location thereof in the designated document by the server.

The above example of parsing and storing the designated document process is described for the purpose of illustration. The process for uploading based on a characteristic value will be described in the next example.

Step 205: after receiving the designated document, the server parsing a respective part corresponding to each paragraph in the designated document into the at least one multimedia resource as a paragraph of the designated document as partition granularity, obtaining the at least one multimedia resource.

The following example illustrates generation of the designated document via the terminal (200A) and parsing of the designated document via the server (200B). In an embodiment, each paragraph of the designated document has only one multimedia resource during the generation of the designated document. Respective portion corresponding to each paragraph may be parsed into one multimedia resource, depending on the paragraphs after performing separation.

If one paragraph of the designated document includes a plurality of multimedia resources during the generation of the designated document, the plurality of multimedia resources included in the one paragraph may further be parse. That is to say, the portion corresponding to the one paragraph may be parsed into a plurality of multimedia resources. The location of the plurality of multimedia resources in the designated document includes not only paragraph, but also a displaying sequence in the paragraph and/or the arrangement of display. The generation method of the multimedia resource corresponds to the parsing method, which both of them may be predetermined by the terminal (200A) and the server (200B).

Step 206: the server stores the at least one multimedia resource, generating the constituent information of the designated document which may include a first resource identification of the at least one multimedia resource. According to an embodiment of the disclosure, the first resource identification is a label used to uniquely identify one multimedia resource. The first resource identification may be a characteristic value, a server storage label or a resource ID (Identity) and the like.

For the server (200B), it may have a second preset database which stores a mapping relationship between the resource identification of the multimedia resource and the designated document. The database may be in a form of a list, as shown in below table 1. Table 1 illustrates a mapping relationship among an identification of the designated document, a multimedia resource identification, storing information and a location of the multimedia resource in the designated document.

TABLE 1

| Multimedia resource | Storing information | The location in the document |
|---|---|---|
| Picture P1 | Storage unit 1 | (file1, paragraph 1) (file2, paragraph 3) |
| Video V2 | Storage unit 2 | (file1, paragraph 2) (file3, paragraph 1) |
| . . . | . . . | . . . |

As shown in Table 1, both picture P1 and video V2 may pertain to a same file 1. The location of picture P1 may be slightly different from video V2, the former may be located in paragraph 1, and the latter may be located in paragraph 2. The picture P1 also pertains to file 2, and may be located in paragraph 3 of file 2. The video V2 may also pertain to file 3 and located in paragraph 1 of file 3.

Accordingly, the constituent information may be shown in table 2. The constituent information in table 2 describes the constituent information including the multimedia resource.

TABLE 2

| Designated document | Multimedia resource |
|---|---|
| File1 | Picture P1; Video V2 . . . |

As shown in table 2, File 1 includes picture P1, video V2 and other multimedia resource. Typically, the elements included in the second preset database may associate with the elements included in the constituent information. The location of one multimedia resource in a certain document may be determined through combining the information corresponding to the multimedia resource in the second preset database and the constituent information generated from the multimedia resource.

Table 3 below may illustrate the second preset database storage of the server, which may store the resource identification of the multimedia resource and the mapping relationship among the files to which the multimedia resource belongs.

TABLE 3

| Multimedia resource | Storing information | Files |
|---|---|---|
| Picture P1 | Storage unit 1 | file1; file2 |
| Video V2 | Storage unit 2 | file1; file3 |
| . . . | . . . | . . . |

As shown in table 3, both picture P1 and video V2 pertain to the same file 1, while picture P1 also pertains to file 2, video V2 also pertains to file 3.

Corresponding to the second preset database shown in table 3, the constituent information also includes the location of the multimedia resource in the designated document such that the exact location of the multimedia resource in the document may be determined depending on constituent information and the second preset database when recalling the multimedia resource by the terminal.

The constituent information may also be depicted in table 4 which takes a condition that the constituent information includes multimedia resource and the location in the designated document as an example.

TABLE 4

| Designated document | Multimedia resource |
|---|---|
| File1 | (picture P1, paragraph 1); (video V2, paragraph 2) . . . |

As shown in table 4, File 1 may include a picture P1 located in paragraph 1, video V2 located in paragraph 2 and other multimedia resource.

In general, the server (200B) stores at least one multimedia resource and generates the constituent information of the designated document. The constituent information may include the first resource identification of the at least one multimedia resource and the generating of the constituent information may include any one of the below conditions.

1) The server (200B) may determine whether the at least one multimedia resource includes a first multimedia resource after the parsing process to obtain the first resource identification of the at least one multimedia resource, wherein the first resource identification being the same as the resource identification of the multimedia resource that has been stored by the server.

In the case if the at least one multimedia resource having the same characteristic value has already been stored in the server, sending multimedia resources other than those at least one multimedia resource which has already been saved to the server; and In the case if the at least one multimedia resource having the same characteristic value has not been stored in the server, sending the at least one multimedia resource to the server.

If the at least one multimedia resource includes the first multimedia resource, then do not store the first multimedia resource, instead establish a mapping relationship among the resource identification having the same multimedia resource as the first multimedia resource, with the designated document and a location of the first multimedia resource in the designated document; respectively store at least one multimedia resource from other multimedia resources, wherein the other multimedia resources are those multimedia resources which are not part of the first multimedia resource. Respectively establishes a mapping relationship in the other multimedia resources, between the stored information and a location of the designated document in the other multimedia resource, so as to generate the constituent information of the designated document according to the established mapping relationship.

(2) The constituent information may be jointly generated by both the terminal (200A) and the server (200B), wherein the constituent information may include the constituent information of both the terminal (200A) and the server (200B). In order to reduce traffic consumption caused by uploading to the server (200B) a large amount of multimedia resource data beyond a preset threshold value, the terminal (200A) may include local storage for the multimedia. The terminal (200A) may maintain a first preset database of a resource identification of the designated document as well as a location of the resource in the designated document.

When generating the designated document, a mapping relationship is established between the designated document and the multimedia resource located in the designated document, wherein the first preset database is greater than a preset resource threshold value of the resource identification, and the first constituent information is generated, wherein the first constituent information may include the resource identification of the multimedia resource with a data volume exceeding the preset threshold value.

The first constituent information will be sent to the server together with other multimedia resource of the designated document when uploading to the server, such that second constituent information may be generated by the server based on receiving the other multimedia resource of the designated document. The second constituent information may include the resource identification of the other multimedia resource. The constituent information of the designated document may be generated by the server (200B) by combining the second and the first constituent information, and sending the combined constituent information to the terminal (200A).

Alternatively, the server (200B) may send the second constituent information to the terminal (200A) such that the terminal (200A) may combine the first and the second constituent information to generate the constituent information of the designated document. When retrieving the designated document for display, the multimedia resource may be obtained from the local storage of the terminal (200A) according to the first constituent information, and the multimedia resource may be obtained from the server (200B) according to the second constituent information.

The above steps 201 to 206 form an exemplary process for generating the designated document from the terminal (200A), uploading the designated document to the server (200B). Afterwards the server (200B) may parse and store the designated document for later generation by the server.

However, in the practice, the designated document may be obtained in any one of following ways:

(a) the terminal (200A) generates the designated document according to at least one multimedia resource through steps 201 to 203. Of course, steps 201 to 203 may also be carried out by server (200B). In other words, steps 201 to 203 in obtaining the multimedia resource and generating the designated document may be performed on the web;

(b) the server (200B) receiving the designated document uploaded from the terminal (200A). The designated document may be uploaded to the server (200B) by the terminal (200A) when performing the parsing step by the server (200B);

(c) obtaining the designated document via a corresponding web link. The terminal (200B) may provide the given web link to server (200B) in order to obtain the designated document by the server (200B). Alternatively, a user may store the given web link on the web, thus the designated document may be obtained via the given web link by the server (200B):

(d) obtaining the designated document sent from one or more contact. The designated document may also be obtained from a session with the contact, which may include, but not limited to, contacts or contact groups. The designated document may also be obtained from the information displayed in a platform of the dynamic information of the contact, such as the article or link forwarded by the contact and the like.

It should be understand that, the process for parsing of the designated document may be achieved by the terminal (200A) or the server (200B). When parsing by the terminal (200A), the terminal (200A) may upload the parsed multimedia resource respectively.

Step 207: sending the constituent information of the designated document to the terminal by the server. Step 207 may be an alternative step. The server (200B) may send the constituent information of the designated document to the terminal (200A). The constituent information of the designated document may not be sent. Under the condition that no constituent information is being sent to the terminal (200A), if the terminal (200A) would retrieve the designated document again, the terminal (200A) may send a request the server (200B) for opening the designated document. Such request may carry the identification of the designated document.

When the server (200B) receives this request, the server (200B) may obtain the constituent information of the designated document based on the identification of the designated document. In this regard, the generating of the designated document corresponding to a type of the request may be according to the constituent information of the designated document, the type of the request and the sending of the generated designated document to the terminal.

Alternatively, the server may not generate any designated document for the terminal, while the sending of the multimedia resource indicated by the constituent information and the location in the designated document to the terminal according to the constituent information of the designated document, such that the designated document is generated by the terminal according to the received multimedia and the location thereof in the designated document.

Alternatively, the terminal may not perform the step of generating the designated document, while the terminal may directly display the received multimedia resource in the same interface based on the location in the designated document. Any of the above methods described may be optional and the specific implementation process may also be carried out in ways modified from above which is not limiting.

Step 208: deleting the designated document, when the constituent information of the designated document from the server is received by the terminal. In order to avoid occupying the storage space of the terminal, the designated document generated in the terminal may be deleted after the step 204 is completed for a period of time and when the terminal receives the constituent information returned from the server. When retrieving or recalling the designated document for display at a later time, the multimedia resource constituting the designated document may be obtained from the server according to the constituent information returned from the server.

Step 208 may be an alternative step. In the practice, the designated document generated by the multimedia resource in the local storage of the terminal or the one downloaded into the local storage of the terminal may not be deleted. Whether or not to delete may not limit the embodiments of the present disclosure.

Step 209: determining a location of the at least one multimedia resource within the designated document according to an editing operation for the at least one multimedia resource.

It may be appreciated that the constituent information may also include some basic information of the designated document, which may include but not limited to, title, abstract, label of the document and the type of the multimedia resource contained in the designated document and the like. In this regard, the basic information may be loaded and displayed initially when the terminal obtains the constituent information, and then obtains the multimedia resource following the constituent information in order to allow the user to have a general understanding of the designated document, rather than the designated document could be reviewed only after loading the whole designated document.

Accordingly, after step 209, the present method may also include: loading and displaying the basic information of the designated document in case that the constituent information includes basic information of the designated document. The process for loading and displaying the designated document may be performed together with the process for obtaining the multimedia resource. Also the process of obtaining the multimedia resource may be performed after loading and displaying the basic information.

Based on step 207 as mentioned above, step 209 may include the following conditions: (1) When receiving the operation request for the designated document, the terminal sends the operation request that carries the identification of the designated document to the server, so that the server obtains the constituent information of the designated document according to the identification of the designated document when receiving the operation request and sends the constituent information of the designated document to the terminal; (2) If the constituent information of the designated document has been stored in the local storage of the terminal, the terminal queries the first preset database according to the identification of the designated document and obtains the constituent information corresponding to the identification of the designated document.

Step 210: the terminal sending the operation request that carries resource identification of the at least one multimedia resource to the server. The terminal may display the designated document, and may also edit the designated document. The request may vary depending on the operation scene. That is to say, the operation request may carry the scene information corresponding to the operation scene, which defines a specific function of the operation request. For example, the displaying request may carry displaying identification. The editing request may carry editing identification. In fact, the identification carried by the request may be in certain fields or as a value in certain flag in the request. The present example makes no specific limitation herein.

Step 211: the server obtains the at least one multimedia resource when the server receives the operation request. A storage path in the server corresponding to the first resource identification and the location of the at least one multimedia resource in the designated document may be obtained from the second preset database of the server which stores the mapping relationship among the resource identification. The storage path in the server and the designated document, and the at least one multimedia resource may be obtained based on the storage path.

The operation request of step 211 may also carry the identification of the designated document that is used to uniquely identify the designated document and/or information of the given account that would be an account of the owner of the designated document. Therefore the location of the at least one multimedia resource in the designated document may be obtained according to a different correspondence stored on the server side. For example, according to the resource identification carried by the operation request, the location of the at least one resource identification in the designated document may be obtained from a correspondence between the resource identification and the identification of the designated document which indicates which document is corresponding to the resource.

Alternatively, according to the resource identification carried by the operation request, the location of the at least one resource identification in the designated document may be obtained from the correspondence between the resource identification and the account information which indicates which account is corresponding to the resource.

Alternatively, according to the resource identification carried by the operation request, the location of the at least one resource identification in the designated document corresponding to the given account information may be obtained from the correspondence among the resource identification, account information and the identification of the designated document. The correspondence among the resource identification, account information and the label of the designated document means which account is corresponding to the resource and which document of the account corresponds to the resource.

More specifically, step 211 may include: obtaining from a first preset database of a terminal, a local storage path corresponding to the first resource identification and the location of the at least one multimedia resource in the designated document according to the first resource identification of the at least one multimedia resource, and obtaining the at least one multimedia resource based on the local storage path, wherein the first preset database stores a mapping relationship among the first resource identification, the local storage path and a document, and/or obtaining from a second preset database of a server, a server storage path corresponding to the first resource identification and the location of the at least one multimedia resource within the designated document according to the first resource identification of the at least one multimedia resource, and obtaining the at least one multimedia resource based on the server saving path, wherein the second preset database stores mapping relationship among the first resource identification, server saving path and document.

It is appreciated that steps 210 and 211 are exemplary steps in the process for the obtaining of the designated document according to the at least one multimedia resource and the location of the at least one multimedia resource within the designated document according to the resource identification of the at least one multimedia resource. The embodiment of the present invention is illustratively described taking the process for obtaining the multimedia resource from the server as an example.

In another embodiment of the present invention, the process may be achieved by the following method: if the multimedia resource is stored in the local storage of the terminal, the local storage path corresponding to the resource identification may be obtained from the first preset database of the terminal according to the resource identification of the at least one multimedia resource, the at least one multimedia resource and the location of the at least one multimedia resource in the designated document may be obtained based on the local storage path. Wherein, the first preset database stores the mapping relationship among resource identification, the local storage path and the document.

In yet another example of the present invention, the process may be achieved by a plurality of interactions between the terminal and the server. For example, when receiving the operation request for the designated document, the terminal obtains the constituent information of the designated document, which at least includes resource identification of at least one multimedia resource. Then the terminal sends the first resource request to the server, which carries the resource identification of the at least one multimedia resource.

When the server receives the first resource request, the server storage path corresponding to the resource identification and the location of the at least one multimedia resource in the designated document are obtained from the second preset database of the server, and then both of them are returned back to the terminal, so that the second resource request that is used to access the server storage path is sent from the terminal to the server, thereby making the server obtain the at least one multimedia resource based on the server storage path. In practice, the obtaining of the at least one multimedia resource are not limited to the above several processes.

Step 212 the server obtains document type corresponding to the scene information according to the scene information which is carried by the operation request. Wherein, the scene information is used to limit the scene for applying the generated designated document, such as displaying, editing, forwarding, sharing and the like. The type of the document may include, but not limited to, the first and second types as will be described below.

Wherein, the first type of the document refers to the designated document capable of being parsed based on the preset logic and displayed, preferably XML (Extensible Markup Language) file. The type of the document in the scene of displaying and forwarding may be corresponding to the first type.

The second type of the document refers to the designated document capable of being edited as rich text format and may be edited by the terminal. Preferably, the second type of the document may be rich text format document such as HTML file, and the like. The type of the document in the scene of editing and sharing may be corresponding to the second type. Regarding the scene of sharing, the type of the document may also be corresponding to another type such as the one that the permission of the edition is opened and may be edited and stored by a number of users simultaneously.

Step 213: Server generating the document type of the designated document according to the at least one multimedia resource and the location of the designated document. In case that the scene information is one which is for displaying, the type of the document is the first type. This type of designated document is generated according to the compilation mode of document determined by the first type based on the at least one multimedia resource and the location thereof in the designated document and may be analyzed based on preset logic.

In the case that the scene information is the one for editing, the type of the document is the second type. This type of designated document is generated according to the compilation mode of document determined by the second type based on the at least one multimedia resource and the location thereof in the designated document and may be edited as rich text format.

In step 213: the server generates various type of designated document depending on different application scenes, so as to avoid over complicated in the operation interface of the terminal side. The order of loading the multimedia resource and the format of displaying the multimedia resource are prescribed in the designated document by the server so as to satisfy the need of the user in the different application scene.

It should be noted that, the terminal (200A) may be the various mobile devices which may use a uniform layout of the document, since various mobile devices may be different in the screen layout. Therefore, the designated document may need to have various layouts for different terminals. That is to say, the server (200B) may generate the designated document based on not only the scene information, but also based on the terminal device information. Accordingly, step 213 may also include: obtaining a layout of the document corresponding to the terminal information according to the terminal information; adjusting the location of the multimedia resource in the designated document according to the layout of the designated document; generating the designated document from the at least one multimedia resource according to the adjusted location.

The terminal information may be the information or operation identification or the like for determining the size of the terminal's screen such as the type of the terminal, the size of the terminal's screen and the like. The type corresponding to the scene information is obtained based on the scene information, and the designated document is generated accordingly according to the obtained type so as to adapt for displaying in the terminal. The layout of the document may be the interface element in the document and the displayed location of the interface element, and the like and may be used to determine the exhibition format of the designated document. For example, for a certain type of the mobile phone with large screen, the layout of the document may include more interface elements and each element is mapped to one interface function. For a certain type of mobile phone with small screen, the layout of the document may include less interface elements and each element is mapped to at least one sub-element which is mapped to an interface function. The designated document may define the parameters of the multimedia resource. The server may process the multimedia resource during the generation of the designated document according to the parameters of the multimedia resource. The processing includes, but not limited to, shrinking or enlarging the picture, adjusting the resolution of the audio and video, and the like. The foregoing only describes some simple examples for the layout of document.

Step 214: the server (200B) sending the generated corresponding type of designated document to the terminal (200A).

Step 215, loading and displaying in sequence, the at least one multimedia resource which constitutes the designated document, according to a resource loading sequence which is determined by the designated document When the terminal receives the designated document, the at least one multimedia resource of the designated document loaded and displayed in sequence according to the resource loading sequence determined by the designated document;

Specifically, the multimedia resource corresponding to the preferable loading information is preferably loaded and displayed according to the preferable loading information in the loading sequence of the resource. The multimedia resource corresponding to the common loading information is loaded and displayed according to the common loading information in the loading sequence of the resource. The designated document defines the loading order of the multimedia resource such that the loading process may be performed according to a sequence of order. The multimedia resource corresponding to the preferable loading information is loaded and displayed initially to show the summary of the designated document to the user, and then the multimedia resource corresponding to the common loading information is loaded in sequence to further add the display of the designated document. When the loading of the whole document is completed, the whole designated document would be obtained.

For example, the preferable loading information may correspond to the multimedia resource with small volume data or that are susceptible for rendering. Other multimedia resource will be loaded later to storage the time for rendering and provide excellent impression with user. The user will not wait for a long time due to incomplete loading. Other multimedia resource may correspond to the common loading information.

Furthermore, in step 215, when displaying at least one resource of the designated document, the at least one resource is displayed in form of block based on the type of the at least one resource. One resource corresponds to one block. The location of the resource in the designated document means the block corresponding to the resource in the document. One block has preset interval with the other to avoid confusion of the displaying format due to different resource. FIG. 3 shows the displaying format. One block may be regarded as one paragraph. This paragraph may include more than one resource and it may be the combination of pluralities of resources of the same type. Therefore, two resources may be apparently distinguished from each other via the form of the block.

The designated document may be parsed into parts, is loaded and displayed in sequence according to respective part of the designated document through step 215 by the terminal. Therefore, the process for loading and rendering will not consume too long a time period, thereby enhancing the loading rate and making the user feel the shrunk loading process.

For the terminals, the profiles preset in different terminals may be different and may be used to determine the displaying logic of the terminal to match the screen parameter of the terminal. The displaying effect of the multimedia resource may be different depending on the different profiles. For example, the profile of a certain terminal prescribes the size of the font with "4th", and then the text in the at least one multimedia resource may be displayed as size of "4th" in the terminal. The profile of a certain terminal prescribes the size of the font with "5th", and then the text in the at least one multimedia resource may be displayed as a size of "5th" in the terminal.

Further, following step 215, the method of the present disclosure may include: performing the editing operation in the second type of the designated document when the terminal displays the designated document in the editing scene, such as adding, deleting or amending operation, and the like. After performing the editing operation and saving the edited document, the edited document may be resent to the server (200B) so as to parse and store the edited document in the server, such that the data in the server side may be synchronized with the editing operation performed in the terminal (200A).

For a designated document, it may include a plurality of multimedia resources with the same type of resource. For example, one designated document may include a plurality of pictures. A way for continuously reviewing the pictures may be provided based on the loose combination in the designated document. That is to say, following step 215, the present method may include: displaying the pictures in the designated document one by one in sequence according to a sliding operation when detecting the sliding operation to the pictures in the designated document.

Figure 4A:
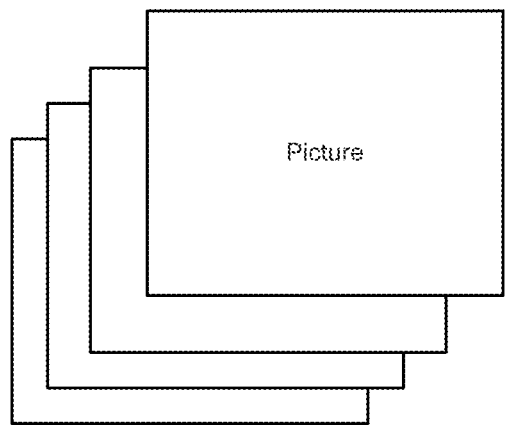
FIGS. 4a and 4b depict displaying of a picture, according to an embodiment of the disclosure.
Figure 4B:
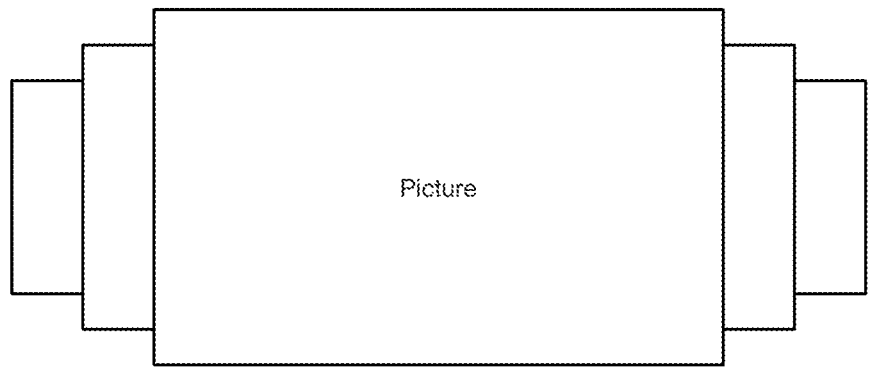

When detecting the sliding operation to any one of the pictures in the designated document, the pictures in the designated document may be displayed according to the direction of the sliding operation of the user and the location of the pictures in the designated document. For example, when sliding form right to left, the picture located behind the currently displaying picture is displayed. When detecting the sliding operation to any one of pictures in the designated document, all pictures in the designated document may also be displayed together based on the designated document in a displaying manner as shown in (a) and (b) of FIG. 4, and then the picture corresponding to the sliding operation of the user is displayed.

The above method of continuously reviewing the pictures may also be used for other type of multimedia resource in the designated document, such as video, audio or text and the like. The way of displaying other type of multimedia resource may be similar to the pictures. The only difference is in that the thumbnails or part contents of other type of multimedia resource are displayed.

For the designated document, a way for preview of a certain multimedia resource may be provided. That is to say, following step 215, the present method may also include: individually displaying the multimedia resource corresponding to the preview instruction when receiving the preview instruction to any one of multimedia resources in the designated document.

Both the terminal and server may store a plurality of designated documents. The plurality of designated document may be displayed as a list. Each entry may correspond to one designated document. The present method may also include: displaying the entries corresponding to the stored designated documents when receiving the instruction for reviewing all stored designated documents. The entry may include information relating to the designated document.

Figure 5:
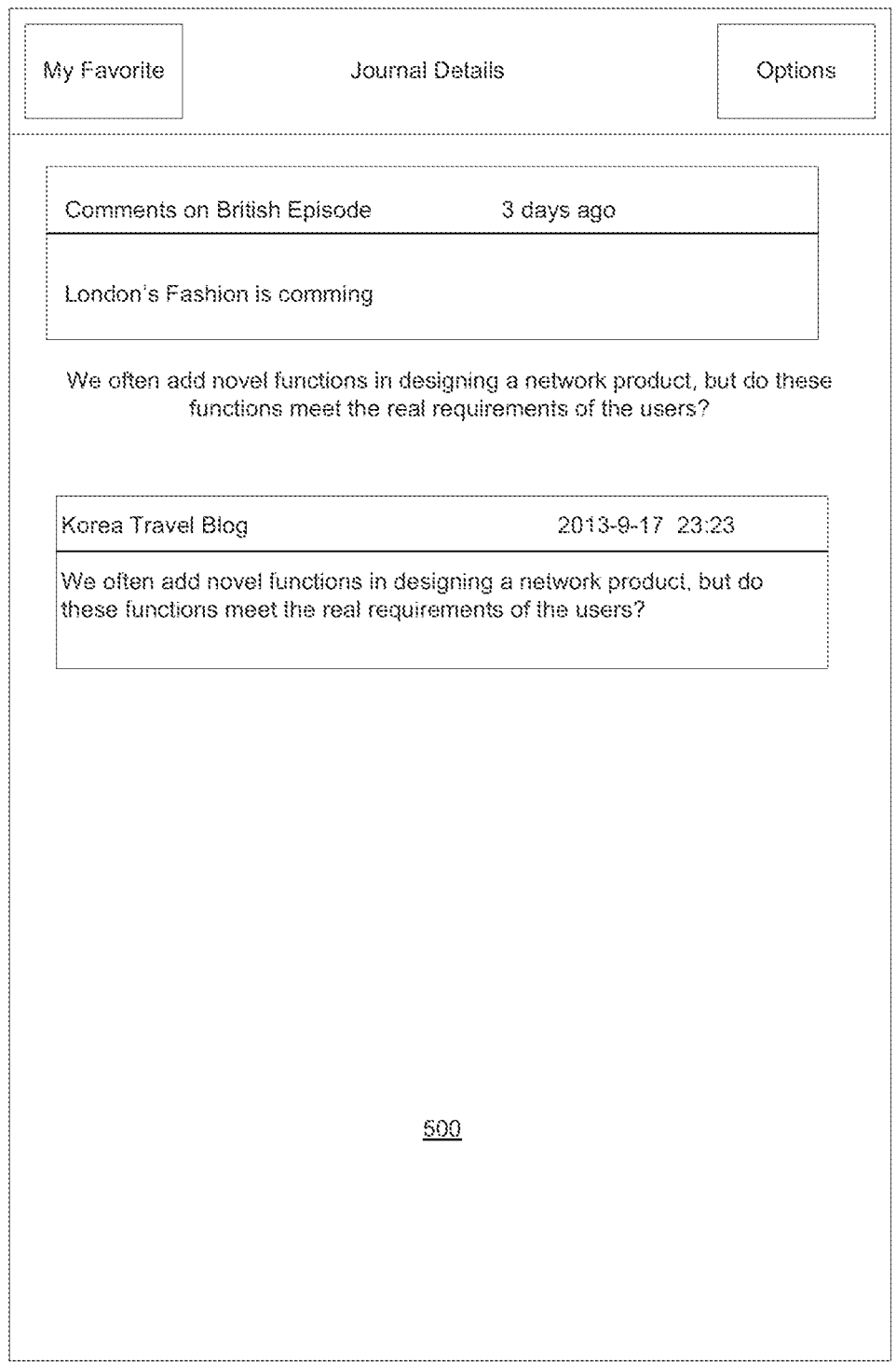
FIG. 5 is depicts a display of a document list, according to an embodiment of the disclosure.

The instruction for reviewing all stored designated documents may be triggered when opening an application used for saving the designated document, alternatively, an option for viewing all stored designated documents may also be provided and the instruction for reviewing all stored designated documents may be trigged as the option is activated. The embodiment of the present invention makes no limitation in this regard. The information relating to the designated document includes title, time for edition, abstract and label and the like of the designated document. The list may be shown in FIG. 5.

The stored plurality of designated document may include various types of resources. Therefore, a method for reviewing the different types of resources by classification may be provided. The method also includes: displaying the designated type of multimedia resource of the stored designated documents according to the designated type of resource when receiving the instruction for reviewing by classification that carries the designated type of resource.

Figure 6:
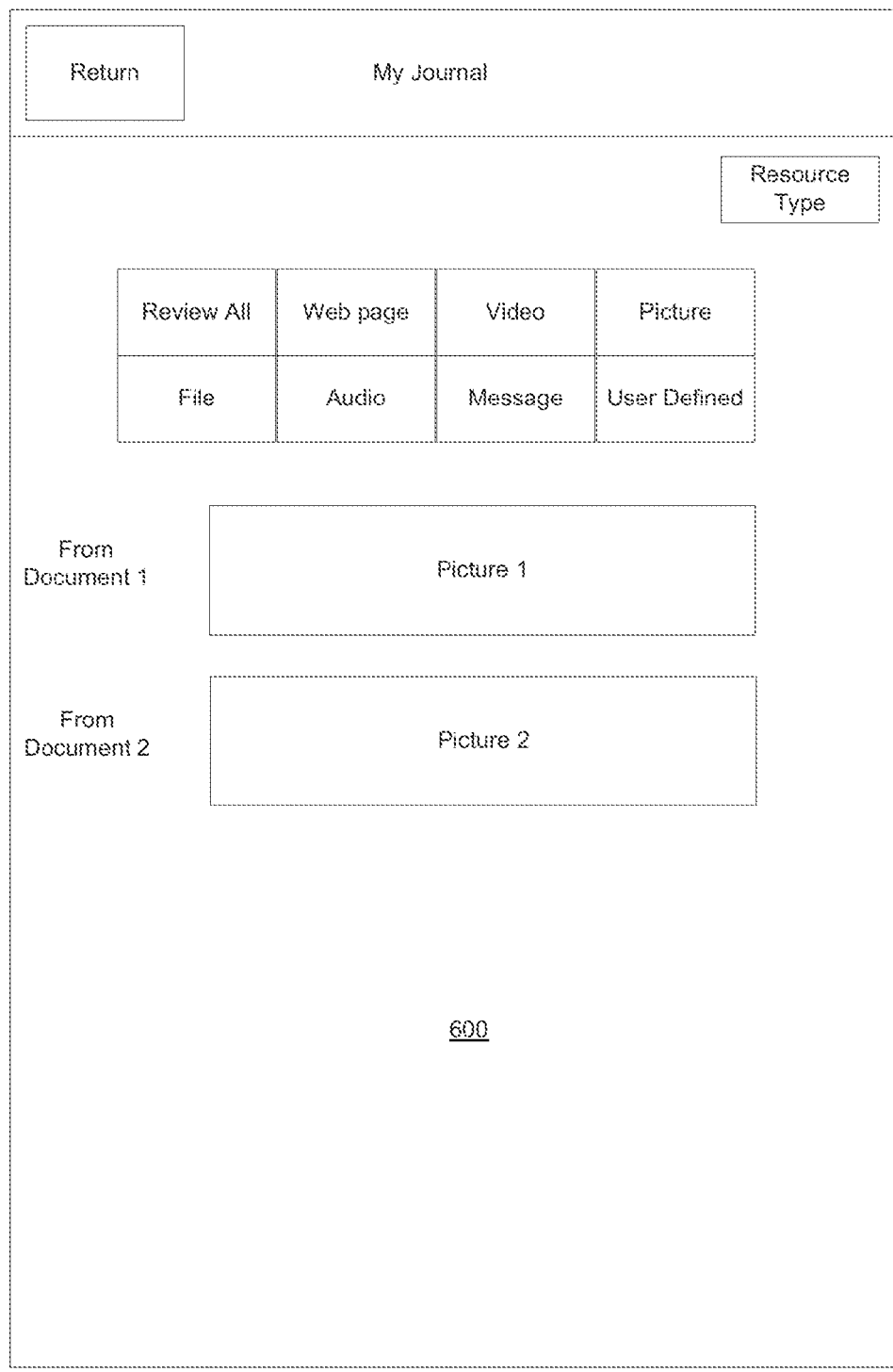
FIG. 6 depicts displaying a page for a classification search, according to an embodiment of the disclosure.

As shown in FIG. 6, it provides a schematic diagram of page layout of querying by classification. The user clicks the picture button when he/she needs to review all of the pictures in the stored designated document, such that the instruction for reviewing the pictures by classification is triggered. At this time, the pictures in the stored designated document are queried according to the type of the picture, thereby displaying the queried pictures as list. The document from which the picture comes is displayed at the same time when displaying the queried pictures. The picture may be previewed via the operation to the picture and the whole designated document which the picture belongs to may be reviewed during preview. Alternatively, the editing or other operation may be performed to the pictures or the designated documents. The subsequent operation is not limited in the embodiment of the present invention. Further, for the multimedia resource in form of picture, the text shown in the picture may be identified while saving the picture, thereby obtaining the key words as the index of the pictures.

Therefore, for such special multimedia resource, the present method may also include: matching the pictures of the stored designated documents with the key words when receiving the instruction for search the pictures with key words and then displaying the matched pictures when the stored designated document includes the picture matching the key words.

Further, the multimedia resource of the designated document is reviewed based on the source of the multimedia resource. The multimedia resource may carry different source identifications depending on the different sources of the multimedia resource. That is to say, the present method may also include: displaying the multimedia resource associated with the source identification in the stored designated document according to the source identification when receiving the instruction for reviewing in groups which carries the source identification.

Figure 7:
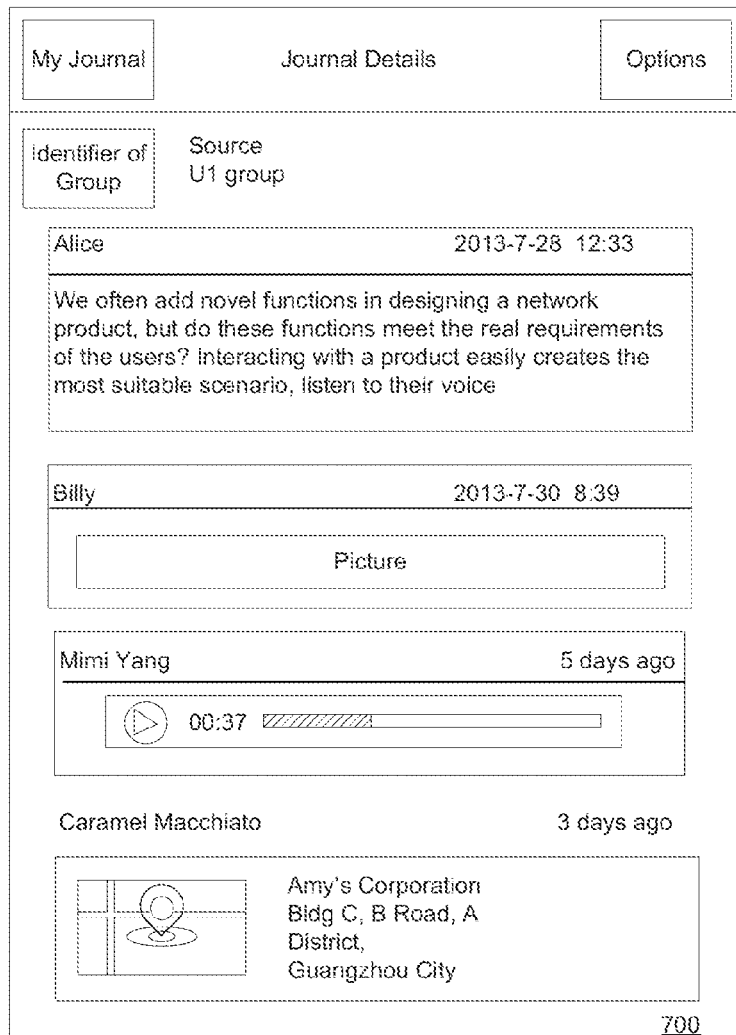
FIG. 7 is a schematic diagram of list of multimedia resource according to the embodiment of the present invention.

If the multimedia resource is from a certain website or added from a certain group session interface or published by a certain contact of a group, the multimedia resource carries the identification of the source and the multimedia resource associated with the identification of the source may be individually reviewed according to the identification of the source. As shown in FIG. 7, it illustratively shows group identification as the identification of the source. The sources of the multimedia resources such as "Alice", "Billy", "Mimi Yang" and "Caramel Macchiato" pertain to the same group, "UI group". The multimedia resources that have correlation with the identification of the group are displayed according to the identification of the group.

Typically, the saving operation may be performed to each multimedia resource of the designated document. That is to say, the present method also includes: saving the multimedia resource corresponding to the saving instruction via the storage path indicated by the saving instruction when receiving the saving instruction for any one of multimedia resource in the designated document. For example, the multimedia resource in the designated document may be stored to the local or publish to other internet disk by utilizing the function such as "saving as".

It is appreciated that an important embodiment of the present invention is to share the designated document or the multimedia resource in the designated document in the scene based on the instant message application. Therefore, the present method also includes: sending the multimedia resource corresponding to the sending instruction to the subject indicated by the sending instruction when receiving the sending instruction for any one of multimedia resource in the designated document.

Specifically, the sending process may be performed as following:

(1) the designated document or multimedia resource corresponding to the sending instruction is sent to the contact that may be the contact of the session or the contact group in the case that the sending instruction carries the contact.

(2) the designated document or multimedia resource corresponding to the sending instruction is shared in the case that the sending instruction is sharing instruction. The sharing may mean to invite others to edit the designated document or multimedia resource together and re-upload the edited designated document or multimedia resource to the server. Herein, only the resource identification or the identification of the designated document may be shared, such that other users may obtain the designated document and edit or review the same according to the resource identification or the identification of the designated document and upload the edited designated document to the server so that the server may parse and storage it.

(3) The designated document or multimedia resource corresponding to the sending instruction is uploaded to the displaying platform of the personal dynamic information in the case that the sending instruction is uploading instruction. The displaying platform of the personal dynamic information may be one of Social Networking Services (SNS) or the displaying platform of the personal dynamic information based on the instant message application. When the sending instruction is the uploading instruction, the designated document or multimedia resource may be uploaded to the displaying platform of the personal dynamic information. Typically, upon uploading to the displaying platform of the personal dynamic information, the uploaded designated document or multimedia resource may also be displayed in the displaying platform of the contact information of the user, such that the contacts in the link of friendship of the user may review the uploaded designated document or multimedia resource by the user in the displaying platform of the contact information.

According to the method provided in the embodiment of the present invention, the designated document may be obtained according to the multimedia resource and the location thereof in the designated document and then the multimedia resource in the designated document is loaded and displayed one by one based on a certain sequence of loading resource during loading, such that the rate of loading document is enhanced, thereby avoid the slow rate of loading document, which will be sensed by the user, rendered due to the fact that the whole document will be displayed upon loading and rendering.

Further, the server may generate different type of designated document for different application scene. The process for determining and generating the different type of the document is moved to the terminal such that the interface of the terminal is simplified, which is suitable for the mobile terminal. Once the scene of usage is moved from the mobile terminal to a fixed terminal such as personal computer, the layout of the page may be re-determined according to the terminal information, such that the layout will suitable for the various terminal, thereby achieving flexibility in use, and the displaying in the terminal is also optimized.

Figure 8:
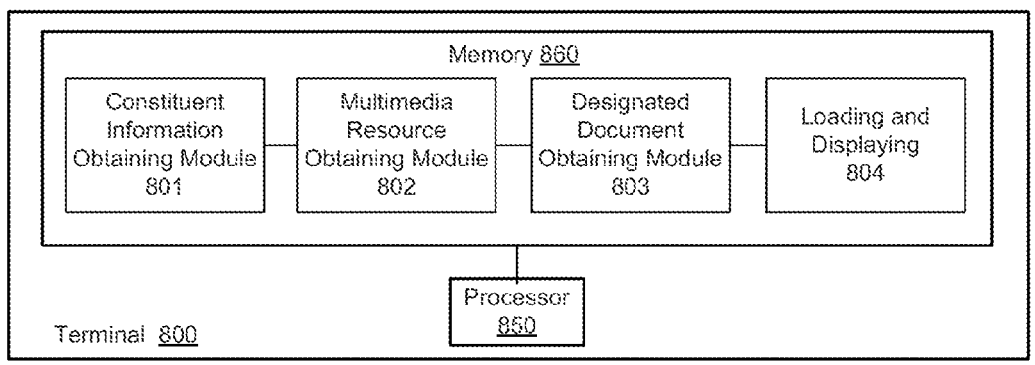
FIG. 8 illustrates an exemplary structure of an apparatus for processing documents, according to an embodiment of the disclosure.

FIG. 8 illustrates an exemplary structure of an apparatus for processing documents, according to an embodiment of the disclosure. Referring to FIG. 8, the apparatus includes at least a processor (850) operating in conjunction with at least a memory (860) which stores instruction codes operable as plurality of modules, wherein the plurality of modules include at least: a constituent information obtaining module (801), a multimedia resource obtaining module (802), a designated document obtaining module (803), a loading and displaying module (804), wherein:

The constituent information obtaining module (801), which upon receiving an operation request for a designated document, obtains constituents information of the designated document, wherein the constituent's information comprises a first resource identification of at least one multimedia resource.

The multimedia resource obtaining module (802), which obtains according to the first resource identification of the at least one multimedia resource, the at least one multimedia resource and a location of the at least one multimedia resource within the designated document; wherein the multimedia resource obtaining module (802) is connected to the constituent information obtaining module (801).

The designated document obtaining module (803) is connected to the multimedia resource obtaining module (802), which obtains the designated document according to the at least one multimedia resource and the location of the at least one multimedia resource within the designated document.

The loading and displaying module (804) connected to the designated document obtaining module (803), which loads and displays in sequence, the at least one multimedia resource which constitutes the designated document, according to a resource loading sequence which is determined by the designated document.

Alternatively, the loading and displaying module (804) may also be used for displaying the at least one resource in the form of block according to the type of the at least one multimedia resource when displaying the at least one resource in the designated document, wherein, one block corresponds to one resource.

Alternatively, the loading and displaying module (804) may include: a priority loading and displaying unit, which prioritizes loading and displaying of a first multimedia resource according to a prioritized loading information in the resource loading sequence, wherein the first multimedia resource corresponds to the prioritized loading information; and a common loading and displaying unit, which loads and displays a second multimedia resource according to common loading information in the resource loading sequence, wherein the second multimedia resource corresponds to the common loading information.

Alternatively, the operation request may carry scene information. The designated document obtaining module (803) may include: a document type obtaining unit, which obtains document type corresponding to the scene information according to the scene information carried by the operation request; and a designated document generating unit, which generates the document type of the designated document according to the at least one multimedia resource and the location of the designated document.

Alternatively, the designated document generating unit may be used for generating a first document type of the designated document, wherein the first document type performs analysis based on preset logic, wherein the generating takes place when the scene information displays a scene and the document type is the first document type, and wherein the generating is according to the at least one multimedia resource and the location of the at least one multimedia resource within the designated document, and a compilation mode determined by the first document type; or the designated document generating unit generates a second document type of the designated document, wherein the second document type performs rich text editing, wherein the generating takes place when the scene information is an editing scene and the document type is the second document type, and wherein the generating is according to the at least one multimedia resource and the location of the at least one multimedia resource within the designated document, and a compilation mode determined by the second document type.

Alternatively, the operation request also carries terminal information. The designated document obtaining module (803) may include: a layout obtaining unit, which obtains a document layout corresponding to the information of the terminal; a designated document generating unit, which adjusts a location of the at least one multimedia resource within the designated document according to the document layout, and generating the designated document according to the adjusted location of the at least one multimedia resource.

Alternatively, the constituent information obtaining module (801) may include: a request sending unit, upon receiving the operation request for the designated document, the terminal sending the operation request to a server, wherein the operation request carries an identification of the designated document, such that server upon receiving the operation request, obtaining the constituent information of the designated document according to the identification of the designated document, and sending the constituent information to the terminal; and a composition information receiving unit, which receives the constituent information of the designated document.

Alternatively, the constituent information obtaining module 801 includes:

A local obtaining receiving unit, for obtaining the constituent information corresponding to the identification of the designated document from the local storage according to the identification of the designated document when receiving the operation request to the designated document carrying the identification of the said document.

Alternatively, the multimedia resource obtaining module (802) may include: a first obtaining unit, which obtains from a first preset database of a terminal, a local storage path corresponding to the first resource identification and the location of the at least one multimedia resource in the designated document according to the first resource identification of the at least one multimedia resource, and obtaining the at least one multimedia resource based on the local storage path, wherein the first preset database stores a mapping relationship among the first resource identification, the local storage path and a document; and/or a second obtaining unit, which obtains from a second preset database of a server, a server storage path corresponding to the first resource identification and the location of the at least one multimedia resource within the designated document according to the first resource identification of the at least one multimedia resource, and obtaining the at least one multimedia resource based on the server saving path, wherein the second preset database stores mapping relationship among the first resource identification, server saving path and document.

Alternatively, the second obtaining unit may include: a first request subunit, which sends a first resource request that carries the resource identification of the at least one multimedia resource from the terminal to the server, such that the server obtains the server storage path corresponding to the first resource identification and the location of the at least one multimedia resource within the designated document from the second preset database of the server, and sending to the terminal, the server saving path and the location of the at least one multimedia resource in the designated document; a second request subunit, which sends the second resource request that carries the server's storage path to the server when the terminal receives the server storage path and the location of the at least one multimedia resource within the designated document, such that the server sends the at least one multimedia resource to the terminal according to an access of the server to the server storage path; and a resource receiving subunit, which receives the at least one multimedia resource by the terminal.

Alternatively, the present apparatus may also include: a document obtaining module, which obtains the designated document which comprises the at least one multimedia resource; a parsing module, which parses the designated document to obtain the at least one multimedia resource; and a constituent information generating module, which saves the at least one multimedia resource to generate the constituent information of the designated document.

Alternatively, the parsing module parses a portion corresponding to each paragraph of the designated document as a singular multimedia resource, utilizing the paragraph of the designated document as partitioning granularity in order to obtain the at least one multimedia resource.

Alternatively, the document obtaining module includes at least one of: a first obtaining unit, which generates the designated document according to the at least one multimedia resource; or a second obtaining unit, which receives the designated document uploaded by the terminal; or a third obtaining unit, which obtains the designated document corresponding to a designated web link according to the designated web link; or a fourth obtaining unit, which obtains the designated document sent by a contact.

Alternatively, the first obtaining unit includes: a multimedia resource obtaining subunit, which obtains the at least one multimedia resource; a location determining subunit, which determines a location of the at least one multimedia resource in the designated document according to an editing operation to the at least one multimedia resource; and a document obtaining subunit, generates the designated document according to the at least one multimedia resource and the location in the designated document.

Alternatively, the multimedia resource obtaining subunit provides an editing interface, wherein the editing interlace is utilized to add to the at least one multimedia resource which constitutes the designated document; and obtains the at least one multimedia resource which has been added via the editing interface by the user.

Alternatively, the apparatus also includes: a synchronization module, which synchronizes the designated document with a server.

Alternatively, the synchronous module includes at least one of: a document sending unit, which sends the designated document itself to the server such that the at least one multimedia resource in the designated document is parsed and stored by the server; or a characteristic value sending unit, which sends a characteristic value of the at least one multimedia resource in the designated document to the server; wherein: in the case if the at least one multimedia resource having the same characteristic value has already been stored in the server, sends multimedia resources other than those at least one multimedia resource which has already been saved to the server; and in the case if the at least one multimedia resource having the same characteristic value has not been stored in the server, sends the at least one multimedia resource to the server.

Alternatively, the apparatus also includes: an edition module, which edits the designated document according to an editing operation to the designated document; and an edition sending module, which sends the edited designated document to a server, such that the server parses and stores the edited designated document according to the at least one multimedia resource which constitutes the edited designated document.

Alternatively, the apparatus also includes: a sliding and displaying module, which upon detecting a sliding operation to the pictures in the designated document, displays one by one, pictures in the designated document according to the sliding operation.

Alternatively, the apparatus also includes: an individually displaying module, which upon receiving, a previewing command for any one of the at least one multimedia resource in the designated document, individually displaying the at least one multimedia resource corresponding to the previewing command.

Alternatively, the apparatus also includes: an entries displaying module, which performs at least one or more of:

upon receiving a classification review command wherein the classification review command carries a designated multimedia resource type, displays the designated multimedia resource type which has been stored in the designated document according to the designated multimedia resource type;

upon receiving a group review command wherein the group review command carries a source identification, displays multimedia resource associated with the source identification which has been stored in the designated document according to the source identification;

upon receiving a storing command to any one of the at least one multimedia resources in the designated document, storing the at least one multimedia resource corresponding to the storing command according to a storing path as indicated by the storing command;

upon receiving a sending command for the designated document or any one of the at least one multimedia resources in the designated document, sends the at least one multimedia resource corresponding to the sending command to a subject as indicated by the sending command;

upon receiving a command for reviewing all multimedia resources in the designated document, displays entries which correspond to a stored designated document, wherein the entries comprise information associated with the designated document.

Alternatively, the apparatus also includes: a classification displaying module, which upon receiving a classification review command wherein the classification review command carries a designated multimedia resource type, displays the designated multimedia resource type which has been stored in the designated document according to the designated multimedia resource type.

Alternatively, the apparatus also includes: a grouping displaying module, which upon receiving a group review command wherein the group review command carries a source identification, displays multimedia resource associated with the source identification which has been stored in the designated document according to the source identification.

Alternatively, the apparatus also includes: a saving module, upon receiving a storing command to any one of the at least one multimedia resource in the designated document, stores the at least one multimedia resource corresponding to the storing command according to a storing path as indicated by the storing command.

Alternatively, the apparatus also includes: a multimedia resource sending module, which upon receiving a sending command for the designated document or any one of the at least one multimedia resources in the designated document, sends the at least one multimedia resource corresponding to the sending command to a subject as indicated by the sending command.

Alternatively, the multimedia resource sending module includes at least one of: a first resource sending unit, in case that the sending command carries a personal contact, sends the designated document or the at least one multimedia resource corresponding to the sending command to the personal contact; or a second resource sending unit, in case that the sending command is a sharing command, shares the designated document corresponding to the sending command or the first resource identification associated with the multimedia resource; or a third resource sending unit, which in case that the sending command is an uploading command, uploads the designated document corresponding to the sending command or the multimedia resource to a personal dynamic information display platform.

The operation request also carries identification of the designated document and/or designated account information. The multimedia resource obtaining module obtains the server storage path corresponding to a second resource identification from the second preset database of the server according to the first resource identification of the at least one multimedia resource; obtains the location of the at least one multimedia resource in the designated document from a correspondence between the first resource identification and the identification of the designated document and/or correspondence between first resource identification and account information according to the first resource identification of the at least one multimedia resource; obtains the at least one multimedia resource based on the server storage path, wherein the second preset database stores mapping relationship among the first resource identification, server storage path and document.

The embodiment of the present invention also provides a terminal, which includes an apparatus for processing documents described in any one of the embodiments as mentioned above. The designated document may be obtained according to the multimedia resource and the location thereof in the designated document and then the multimedia resource in the designated document is loaded and displayed one by one according to the resource loading sequence, thereby enhancing the loading rate of the document, such that the low loading rate rendered due to the fact that the document is displayed upon loading and rendering the whole document is avoided.

Figure 9:
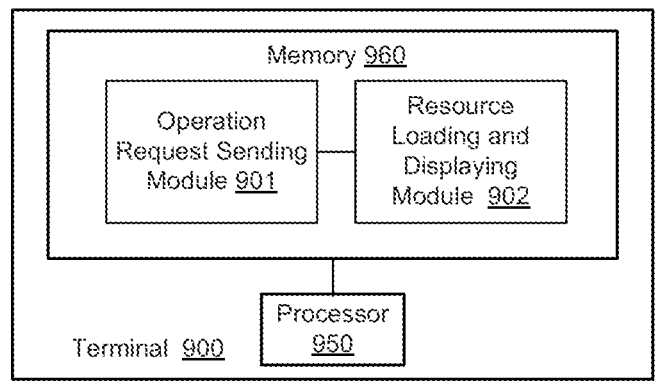
FIG. 9 illustrates an exemplary structure of an apparatus for processing documents, according to another embodiment of the disclosure.

FIG. 9 illustrates an exemplary structure of an apparatus for processing documents, according to another embodiment of the disclosure. Referring to FIG. 9, the apparatus includes at least: an operation request sending module (901) and a resource loading and displaying module (902); wherein, the operation request sending module (901) is used to send operation request for the designated document to the server, which carries constituent information of the designated document including the resource identification of the at least one multimedia resource, such that the server obtains the designated document according to the constituent information and returns the designated document that includes the at least one multimedia resource. The resource loading and displaying module (902) is connected to the operation request sending module (901) is used, to load and display the at least one multimedia resource of the designated document one by one according to the resource loading sequence determined by the designated document when receiving the designated document.

Alternatively, the resource loading and displaying module (902) is also used to respectively display the at least one resource in the form of block according to the type of the at least one resource when displaying the at least one resource of the designated document. Wherein, one resource corresponds to one block.

Alternatively, the resource loading and displaying module (902) includes: a priority displaying unit, which prioritizes loading and displaying of a first multimedia resource according to prioritized loading information in the resource loading sequence, wherein the first multimedia resource corresponds to the prioritized loading information.

Alternatively, the apparatus also includes: a constituent information obtaining module, which upon receiving an operation request for a designated document, obtains constituents information of the designated document, wherein the constituents information comprises a first resource identification of at least one multimedia resource.

Alternatively, the constituent information obtaining module includes: an operation request sending unit, for sending the operation request carrying the identification of the designated document to the server upon receiving the operation request to the designated document, such that the server obtains the constituent information of the designated document according to the identification thereof when the server receives the operation request and returns the same.

Alternatively, the constituent information obtaining module includes: an obtaining unit, for obtaining the constituent information corresponding to the identification of the designated document from the local storage according to the identification of the designated document when receiving the operation request to the designated document carrying the identification of the designated document.

Alternatively, the apparatus also includes: a document obtaining module, which obtains the designated document which comprises the at least one multimedia resource; a parsing module, which parses the designated document to obtain the at least one multimedia resource; a constituent information generating module, which saves the at least one multimedia resource to generate the constituent information of the designated document.

Alternatively, the parsing module parses a portion corresponding to each paragraph of the designated document as a singular multimedia resource, utilizing the paragraph of the designated document as partitioning granularity in order to obtain the at least one multimedia resource.

Alternatively, the document obtaining module includes at least one of: a first obtaining unit, which generates the designated document according to the at least one multimedia resource; or a second obtaining unit, which receives the designated document uploaded by the terminal; or a third obtaining unit, which obtains the designated document corresponding to a designated web link according to the designated web link; or a fourth obtaining unit, which obtains the designated document sent by a contact.

Alternatively, the first obtaining unit includes: a multimedia resource obtaining subunit, which obtains the at least one multimedia resource; a location determining subunit, which determines a location of the at least one multimedia resource in the designated document according to an editing operation to the at least one multimedia resource; and a document obtaining subunit, generates the designated document according to the at least one multimedia resource and the location in the designated document.

Alternatively, the resource obtaining subunit provides an editing interface, wherein the editing interface is utilized to add to the at least one multimedia resource which constitutes the designated document; and obtains the at least one multimedia resource which has been added via the editing interface by the user.

Alternatively, the apparatus also includes: a synchronization module, for synchronizing the designated document with the server.

Alternatively, the synchronization module includes: a document sending unit, which sends the designated document itself to the server such that the at least one multimedia resource in the designated document is parsed and stored by the server; or a characteristic value sending unit, which sends a characteristic value of the at least one multimedia resource in the designated document to the server; wherein: in the case if the at least one multimedia resource having the same characteristic value has already been stored in the server, sends multimedia resources other than those at least one multimedia resource which has already been saved to the server; and in the case if the at least one multimedia resource having the same characteristic value has not been stored in the server, sends the at least one multimedia resource to the server.

Alternatively, the apparatus also includes: an edition module, which edits the designated document according to an editing operation to the designated document; an document sending module, which sends the edited designated document to a server, such that the server parses and stores the edited designated document according to the at least one multimedia resource which constitutes the edited designated document.

Alternatively, the apparatus also includes: a sliding and displaying module, which upon detecting a sliding operation to the pictures in the designated document, displays one by one, pictures in the designated document according to the sliding operation.

Alternatively, the apparatus also includes: a preview displaying module, which upon receiving a previewing command for any one of the at least one multimedia resources in the designated document, individually displaying the at least one multimedia resource corresponding to the previewing command.

Alternatively, the apparatus also includes: an entries displaying module, for displaying the entries corresponding to the stored designated document, which includes information associated with the designated document, when receiving the instruction for reviewing all.

Alternatively, the apparatus also includes: a classification displaying module, upon receiving a classification review command wherein the classification review command carries a designated multimedia resource type, displays the designated multimedia resource type which has been stored in the designated document according to the designated multimedia resource type.

Alternatively, the apparatus also includes: a grouping displaying module, upon receiving a group review command wherein the group review command carries a source identification, displays multimedia resource associated with the source identification which has been stored in the designated document according to the source identification.

Alternatively, the apparatus also includes: a storing module, upon receiving a storing command to any one of the at least one multimedia resource in the designated document, storing the at least one multimedia resource corresponding to the storing command according to a storing path as indicated by the storing command.

Alternatively, the apparatus also includes: a resource sending module, upon receiving a sending command for the designated document or any one of the at least one multimedia resource in the designated document, sends the at least one multimedia resource corresponding to the sending command to a subject as indicated by the sending command.

Alternatively, the resource sending module includes: a first sending unit, upon receiving a command for reviewing all multimedia resources in the designated document, displays entries which correspond to a stored designated document, wherein the entries comprise information associated with the designated document, or a second sending unit, for sharing the designated document or the resource identification of the multimedia resource corresponding to the sending instruction in the case that the sending instruction is sharing instruction, or a third sending unit, for uploading the designated document or multimedia resource corresponding to the sending instruction to the displaying platform of personal dynamic information in the case that the sending instruction is uploading instruction.

Alternatively, the operation request also carries identification of the designated document and/or designated account information of mobile terminal. The designated document according to the multimedia resource and the location thereof in the designated document is obtained and then the multimedia resource in the designated document is loaded and displayed in sequence one by one according to the resource loading sequence, thereby enhancing the loading rate of the document, such that the low loading rate rendered due to the fact that the document is displayed upon loading and rendering the whole document is avoided.

Figure 10:
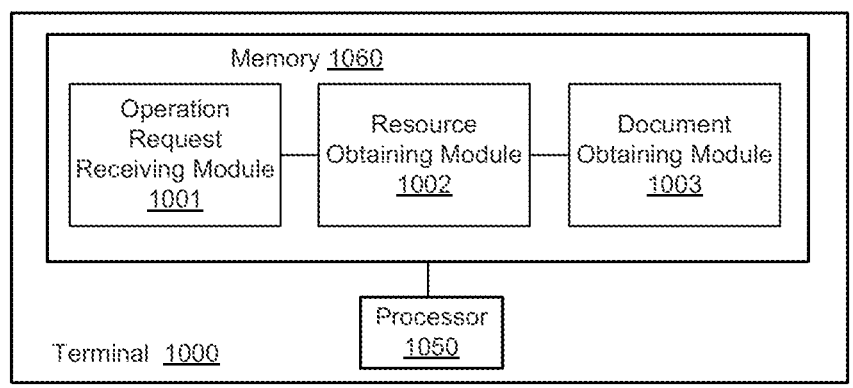
FIG. 10 illustrates an exemplary structure of an apparatus for processing documents, according to another embodiment of the disclosure.

FIG. 10 illustrates an exemplary structure of an apparatus for processing documents, according to another embodiment of the disclosure. Referring to FIG. 10, the apparatus includes: at least a processor (1050) operating in conjunction with at least a memory (1060) which stores instruction codes operable as plurality of modules, wherein the plurality of modules includes: an operation request receiving module (1001), and a resource obtaining module (1002) as well as a document obtaining module (1003).

The operation request receiving module (1001) is used to receive the operation request for the designated document that carries the constituent information of the designated document including a first resource identification of at least one multimedia resource. The resource obtaining module (1002) connected to the operation request module (1001) is used to obtain at least one multimedia resource and the location thereof in the designated document according to the resource identification of the at least one multimedia resource of the constituent information. The document obtaining module (1003) connected to the resource obtaining module (1002) is used to obtain the designated document according to the at least one multimedia resource and the location thereof in the designated document and return the obtained designated document.

Alternatively, the operation request also carries scene information and the document obtaining module (1003) includes: a document type unit, which obtains document type corresponding to the scene information according to the scene information carried by the operation request, a designated document generating unit, which generates the document type of the designated document according to the at least one multimedia resource and the location of the designated document.

Alternatively, the document generating unit includes: a first generation subunit, for generating a first document type of the designated document, wherein the first document type performs analysis based on preset logic, wherein the generating takes place when the scene information displays a scene and the document type is the first document type, and wherein the generating is according to the at least one multimedia resource and the location of the at least one multimedia resource within the designated document, and a compilation mode determined by the first document type; or a second generation subunit, for generating a second document type of the designated document, wherein the second document type performs rich text editing, wherein the generating takes place when the scene information is an editing scene and the document type is the second document type, and wherein the generating is according to the at least one multimedia resource and the location of the at least one multimedia resource within the designated document, and a compilation mode determined by the second document type.

Alternatively, the operation request also carries terminal information, and the document obtaining module (1003) includes: a layout obtaining unit, which obtains a document layout corresponding to the information of the terminal; a location adjusting unit, which adjusts a location of the at least one multimedia resource within the designated document according to the document layout, and generating the designated document according to the adjusted location of the at least one multimedia resource.

The apparatus also includes:

a designated document obtaining module, for generating the designated document according to the at least one multimedia resource, or receiving the designated document uploaded by terminal, or obtaining the designated document corresponding to a designated web link according to the designated web link, or obtaining the designated document sent from a contact;

A path obtaining unit, for obtaining a server storage path corresponding to the resource identification from the second preset database of the server according to the resource identification of at least one resource;

a location obtaining unit, for obtaining the location of the at least one resource in the designated document from the correspondence between the resource identification and the identification of the designated document and/or the correspondence between the resource identification and account information according to the resource identification of the at least one resource;

a resource obtaining unit, for obtaining at least one resource based on the server saving path, wherein the second preset database stores a mapping relationship among resource identification, server's saving path and document.

Alternatively, the path obtaining unit includes:

a first receiving subunit, for receiving a first resource request sent from a terminal, which carries the resource identification of the at least one multimedia resource;

a second receiving subunit, for obtaining the server storage path corresponding to the resource identification and the location of the at least one multimedia resource in the designated document from the second preset database and sending the server storage path and the location of the at least one multimedia resource in the designated document to the terminal, such that the terminal sends a second resource request to the terminal, which carries the server storage path; when the server receives the second resource request, the at least one multimedia resource is sent to the terminal through accessing the server storage path by the terminal.

A loading rate of the document may be enhanced by obtaining the designated document according to the multimedia resource and the location thereof in the designated document, and then loading and displaying the multimedia resource in the designated document one by one according to the resource loading sequence, in order to avoid rendering a low loading rate due to the fact that the document is displayed after the whole document is loaded.

It should be understood that the apparatus for processing documents in the aforesaid embodiments is illustratively described by way of respective function modules. In practice, the aforesaid function may be distributed to various functional modules as needed. That is to say, the internal structure of the terminal may be separated into various functional modules so as to achieve all or part of the aforesaid function. Additionally, the apparatus and methods for processing documents in the aforesaid embodiments pertain to a single concept. The details of the process are described in the method embodiments and may not be repeated herein.

Figure 11:
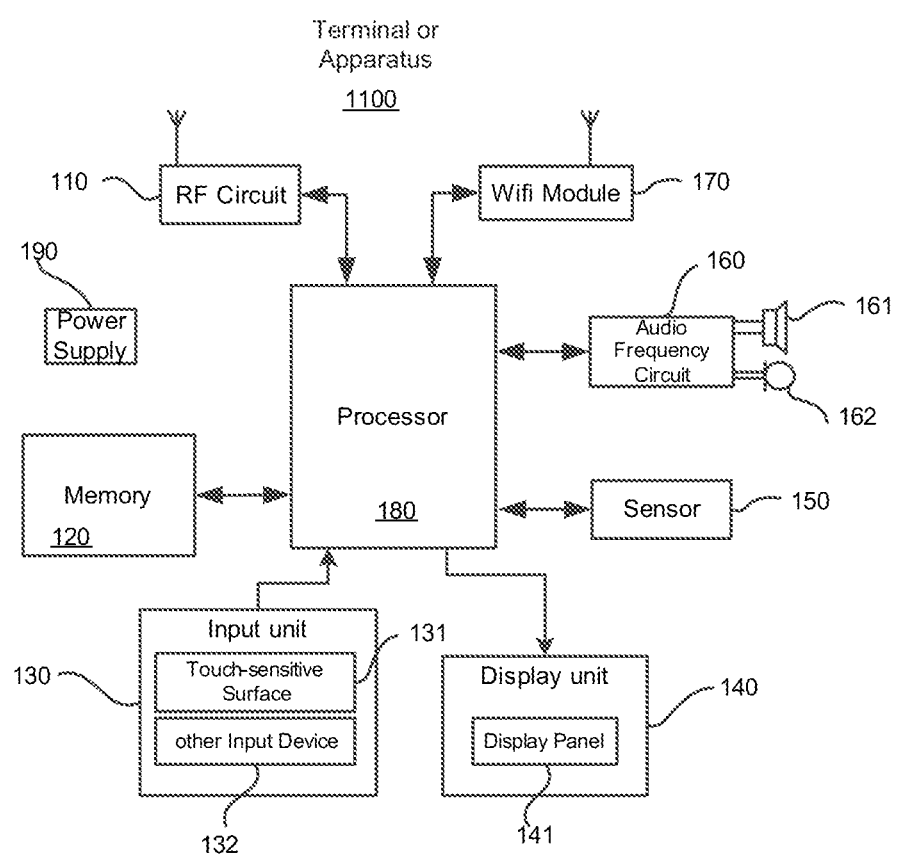
FIG. 11 illustrates an exemplary structure of a terminal device for processing documents, according to another embodiment of the disclosure.

FIG. 11 is an exemplary structural diagram of a terminal (1100) for processing documents, according to another embodiment of the disclosure. The terminal (1100) may include at least: a RF (Radio Frequency) Circuit (110), a Memory (120) which may include one or more non-transitory computer readable storage medium, an Input unit (130), a Display unit (140), a Sensor (150), an Audio Frequency Circuit (160), a WiFi (wireless fidelity) Module (170), a Processor (180) which may include one or more processing cores and a Power Supply (190) etc. A person skilled in the art recognizes that the terminal (1100) is not limited to its structure shown in FIG. 11; it may include more or less components than the components depicted in the Figure, or their equivalence or in any combinations.

The RF Circuit (110) may receive and transmit RF signals during a call or sending and receiving information. More specifically, the RF Circuit (110) may receive downlink information from a base station and submit information to one or more Processor (180) for processing. Additionally, the RF Circuit (110) may send data related to the uplink to the base station. Generally, the RF Circuit (110) may include an antenna, at least one amplifier, a tuner, one or more oscillators, User identity Module (SIM) card, transceiver, coupler, LNA (Low Noise Amplifier) and duplexer, etc. In addition, the RF Circuit (110) may also communicate with other equipment (e.g., terminal B (875) or server (870)) via wireless communications and a network (880). The wireless communication may use any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), e-mail, SMS (Short Messaging Service), etc.

The Memory (120) stores software programs and at least the various disclosed modules. The Processor (180) may run software programs stored in the modules in the memory (120), perform various functions from the applications and process data. The memory (120) may include programs storage area and data storage area, wherein the programs storage area may store the operating system and at least one application with media functions (e.g. sound playback function and image playback function, etc.), etc. The data storage area for storing the generated data (e.g. audio data and phone book, etc.) may depend on the use of the Terminal (1200). In addition, the memory (120) may include high-speed random access memories (RAM), non-volatile memory (ROM), e.g. at least one disks storage device, flash memory devices, or other volatile solid state memory devices. Accordingly, memory (120) may also include a memory controller for providing access to memory (120) by the Processor (180) and the Input unit (130).

The Input unit (130) may receive entered numbers or characters information, and generate keyboard, mouse, joystick and optical or trackball signal input related to user settings and functions control. More specifically, the Input unit (130) may include a Touch-sensitive Surface (131) and other Input Device (132). The Touch-sensitive Surface (131) may also be referred to as touch display screen or touch pad, for collecting the touch operations on or near the screen or pad (e.g. the operations on or near the Touch-sensitive Surface (131) by suitable objects or accessories such as user fingers, stylus etc.), and driving corresponding connecting devices based on the preset programs. Optionally, the Touch-sensitive Surface (131) may include two parts, a touch detection device and a touch controller. Wherein the touch detection device for detecting the user's locations and the signal brought by touch operations, and transmitting the signal to the touch controller. The touch controller may receive touch information from the touch detection device and transform the signals into contact coordinates which will be sent to the Processor (180), and receive and execute the commands from the Processor (180).

In addition, resistance-type, capacitance-type, infrared ray and surface acoustic wave may be applied to form the Touch-sensitive Surface (131). The Input unit (131) may also include other input Device (132) other than the Touch-sensitive Surface (131). Other Input Device (132) may include but not limited to one or more of physical keyboards, function keys (e.g. volume control buttons, switch keys, etc.), trackballs, mouse, joysticks, etc.

The Display unit (140) for displaying the information entered by the user. The information supplied to the user or a variety of graphical user interfaces (GUI) of the Terminal (1200); graphics, texts, icons, videos and any combination of them may constitute as graphical user interfaces. The Display unit 140 may include a Display Panel (141) which may be configured optionally with LCD (Liquid Crystal Display), OLED (Organic Light-Emitting Diode) etc.

Furthermore, the Display Panel (141) may cover Touch-sensitive Surface (131), when the Touch-sensitive Surface (131) detects touch operations on or near itself, it may send signals to the Processor (180) to determine the type of the touch event, then the Processor (180) may provide corresponding visual outputs on the Display Panel (141), depending on the type of the touch event.

The Terminal (1100) may also include a Sensor (150). For example, the sensor (150) may include at least optical sensors, motion sensors and other sensors. Specifically, the optical sensor may include an ambient light sensor and a proximity sensor, wherein, the ambient light sensor may adjust the brightness of the Display Panel (141) according to the ambient light and darkness, a proximity sensor may turn off Display Panel (141) and/or backlight when the Terminal (1100) is moved to the ear. A Gravity acceleration sensor is a motion sensor, which detects a magnitude of acceleration in all directions (generally triaxial), and detect the magnitude and direction of gravity when it is stationary. The sensor (150) may include mobile phone posture applications (e.g. switch the screen anyway, related games and magnetometer posture calibration) and vibration recognition related functions (e.g. pedometers and percussions), etc.; as to the gyroscope, barometer, hygrometer, thermometer, infrared sensors and other sensors which may also supplied on the Terminal 1100 are need not be repeated here.

The voice frequency or Audio Circuit (160) may include a Speaker (161) and a microphone (162) may provide an audio interface between the user and the Terminal (1200). The Audio Circuit (160) may convert the received audio data into an electrical signal to be transmitted to the Speaker (161). Electrical signals may be converted into a sound signal output; On the other hand, the collected sound signal may be converted into electrical signals by Speaker (162). The Audio Circuit (160) may receive the electrical signals and converts them into audio data which may be exported to the Processor (180) for processing and transmitted to another terminal via the RF Circuit (110) or exported to memory (120) for further processing. The Audio Circuit (160) may also include earplug jack to provide communication between the peripheral headset and the Terminal (1200).

WiFi is a technology of short range wireless transmission, the Terminal (1100) may help users to send and receive email, browse the web and access streaming media etc. via the WiFi Module (170), provide users with wireless broadband Internet access.

The Processor (180) may be a control center of the Terminal (1100), for using a variety of interfaces and lines to connect various parts throughout a mobile phone, and executing various functions of the Terminal (1100) and processing data by running or executing software programs and/or modules stored in memory (120) and calling the data stored in memory (120), to achieve the overall control of the mobile phone. Optionally, the Processor (180) may include one or more processing cores; preferably, the Processor (180) may be integrated with an application processor and a modem processor, wherein the application processor is mainly used to process operating system, user interface and applications etc. A modem processor may be used to process wireless communications. It may be understood that the modem processor may not be integrated into Processor 180.

The Terminal (1100) may also include a Power Supply (190) (e.g. a battery) which powers the various components, preferably, the power supply may achieve logic connection with the Processor (180) via the power supply management system, and thus achieving functions such as charging, discharging and power consumption management via the power supply management system. Power Supply (190) may also include one or more power sources such as a DC supply or an AC power supply, recharging system, power supply failure detection circuit, power supply converter or inverter and power supply status indicator etc.

Although not shown in FIG. 11, the Terminal (1100) may also include a camera, a Bluetooth module etc., which need not be described here. Specifically in this embodiment, the display unit of the terminal is a touch display screen, the terminal also includes memories and one or more programs, wherein the one or more programs are stored in the memories and will be executed by one or more processors after configured, in which the commands for following operations are included in the various embodiments of the methods and devices.

Figure 12:
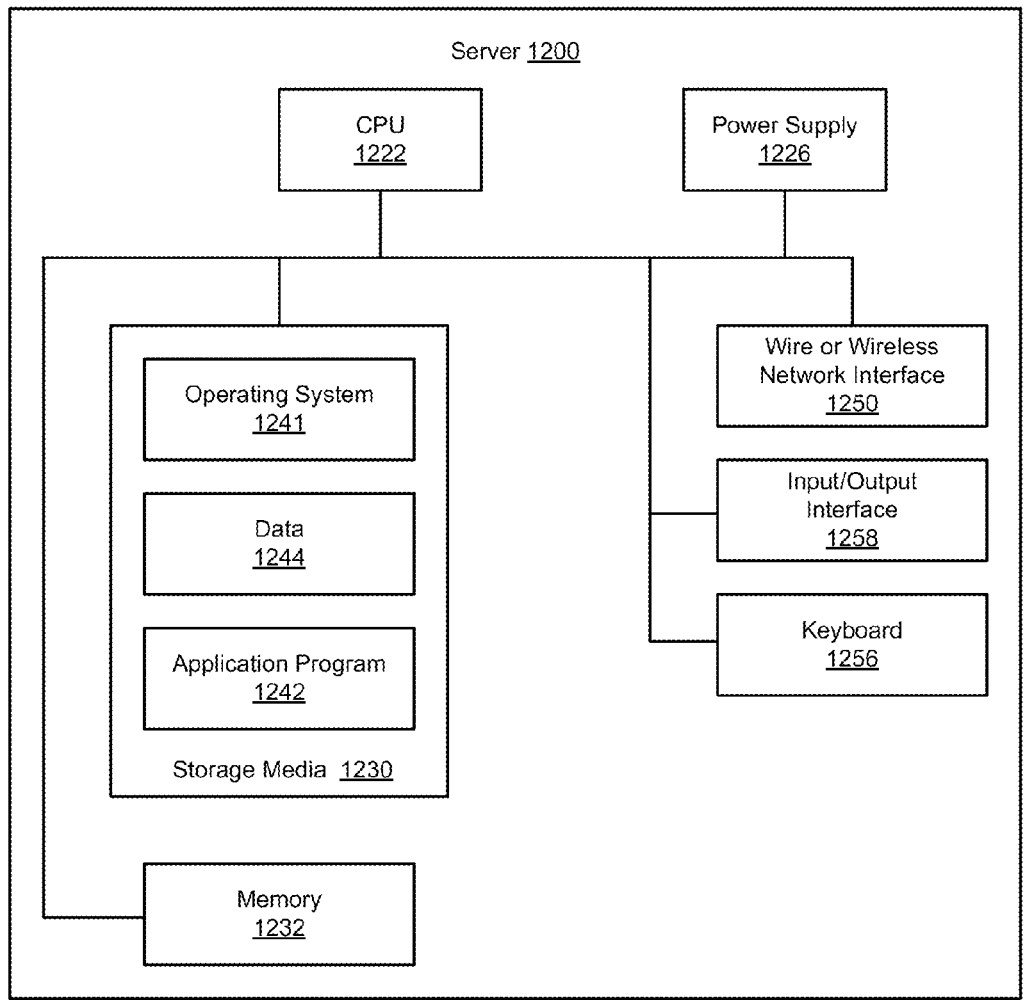
FIG. 12 illustrates an exemplary structure of a server for processing documents, according to another embodiment of the disclosure.

FIG. 12 illustrates an exemplary structure of a server for processing documents, according to another embodiment of the disclosure. Referring to FIG. 12, the server 1200 may vary depending on configuration or performance, which may include one or more central processing units (CPU) (1222) (such as one or more processor) and memory (1232), one or more storage media (1230) for storing application program (1242) or data (1244) (such as one or more mass storage device). The memory (1232) and storage media (1230) may be temporary or permanent storage. The program stored in the storage media (1230) may include one or more modules (not shown), and each module may include operation in response to a series of instructions from the server. Furthermore, the central processor (1222) may be configured to communicate with the storage media (1230) and perform operations on the server in response to a series of instructions in the storage media (1230).

The server (1200) further includes one or more power supply (1226), one or more wire or wireless network interface (1250), one or more input and output interface (1258), one or more keyboards (1256), and/or one or more operation systems (1241) such as Windows Server™, Mac OS X™, Unix™, Linux™, FreeBSD™ and the like.

It should be understood by those with ordinary skill in the art that all or some of the steps of the foregoing embodiments may be implemented by hardware, or software program codes stored on a non-transitory computer-readable storage medium with computer-executable commands stored within. For example, the disclosure may be implemented as an algorithm as codes stored in a program module or a system with multi-program-modules. The computer-readable storage medium may be, for example, nonvolatile memory such as compact disc, hard drive. ROM or flash memory. The computer-executable commands are used to enable a computer, server, a smart phone, a tablet or any similar computing device to render using speech to control to an application startup and its operations on a terminal.

The foregoing represents only some preferred embodiments of the present disclosure and their disclosure may not be construed to limit the present disclosure in any way. Those of ordinary skill in the art will recognize that equivalent embodiments may be created via slight alterations and modifications using the technical content disclosed above without departing from the scope of the technical solution of the present disclosure, and such summary alterations, equivalent has changed and modifications of the foregoing embodiments are to be viewed as being within the scope of the technical solution of the present disclosure.

What is claimed is:

1. A method for processing documents, comprising executing program codes stored in a memory by a processor in a terminal, wherein the terminal is being configured to perform the method, comprising:

upon receiving an operation request for a designated document wherein the operation request carries scene information, obtaining constituent information of the designated document, wherein the constituents information comprises a first resource identification of at least one multimedia resource;

obtaining, according to the first resource identification of the at least one multimedia resource, the at least one multimedia resource and a location of the at least one multimedia resource within the designated document;

obtaining the designated document according to the at least one multimedia resource and the location of the at least one multimedia resource within the designated document;

obtaining document type corresponding to the scene information according to the scene information carried by the operation request;

generating the document type of the designated document according to the at least one multimedia resource and the location of the designated document;

generating a first document type of the designated document, wherein the first document type performs analysis based on preset logic, wherein the generating takes place when the scene information displays a scene and the document type is the first document type, and wherein the generating is according to:

the at least one multimedia resource and the location of the at least one multimedia resource within the designated document, and a compilation mode determined by the first document type; or generating a second document type of the designated document, wherein the second document type performs rich text editing, wherein the generating takes place when the scene information is an editing scene and the document type is the second document type, and wherein the generating is according to:

the at least one multimedia resource and the location of the at least one multimedia resource within the designated document, and a compilation mode determined by the second document type; and enhancing a loading rate of the designated document by loading and displaying in sequence, the at least one multimedia resource which constitutes the designated document according to a resource loading sequence which is determined by the designated document, such that the loading and displaying sequence enables the designated document starts being displayed without having to wait for a completion of loading and rendering of a whole document which the designated document being one of a plurality of documents or files within the whole document.

2. The method according to claim 1, wherein the loading and displaying in sequence, the at least one multimedia resource according to the resource loading sequence, comprising:

prioritizing loading and displaying a first multimedia resource according to a prioritized loading information in the resource loading sequence, wherein the first multimedia resource corresponds to the prioritized loading information;

loading and displaying a second multimedia resource according to common loading information in the resource loading sequence, wherein the second multimedia resource corresponds to the common loading information.

3. The method according to claim 1, wherein the operation request also carries information of a terminal and wherein the obtaining of the designated document according to the at least one multimedia resource and the location of the at least one multimedia resource within the designated document, comprising:

obtaining a document layout corresponding to the information of the terminal;

adjusting a location of the at least one multimedia resource within the designated document according to the document layout, and generating the designated document according to the adjusted location of the at least one multimedia resource.

4. The method according to claim 1, wherein the obtaining of the constituent information of the designated document, comprising:

upon receiving the operation request for the designated document, the terminal sending the operation request to a server, wherein the operation request carries an identification of the designated document, such that server upon receiving the operation request, obtaining the constituent information of the designated document according to the identification of the designated document, and sending the constituent information to the terminal;

receiving by the terminal, the constituent information of the designated document.

5. The method according to claim 1, wherein the obtaining of the constituent information of the designated document, comprising:

upon receiving the operation request for the designated document, wherein the operation request carries an identification of the designated document, obtaining the constituent information corresponding to the identification of the designated document from a local storage of a terminal according to the identification of the designated document.

6. The method according to claim 1, wherein the obtaining of the designated document according to the at least one multimedia resource and the location of the at least one multimedia resource within the designated document, comprising:

obtaining from a first preset database of a terminal, a local storage path corresponding to the first resource identification and the location of the at least one multimedia resource in the designated document according to the first resource identification of the at least one multimedia resource, and obtaining the at least one multimedia resource based on the local storage path, wherein the first preset database stores a mapping relationship among the first resource identification, the local storage path and a document; and/or obtaining from a second preset database of a server, a server storage path corresponding to the first resource identification and the location of the at least one multimedia resource within the designated document according to the first resource identification of the at least one multimedia resource, and obtaining the at least one multimedia resource based on the server saving path, wherein the second preset database stores mapping relationship among the first resource identification, server saving path and document.

7. The method according to claim 6, wherein the obtaining from the second preset database of the server, the server storage path corresponding to the first resource identification and the location of the at least one multimedia resource within the designated document according to the first resource identification of the at least one multimedia resource, and obtaining of the at least one multimedia resource based on the server saving path, comprising:

sending a first resource request that carries the resource identification of the at least one multimedia resource from the terminal to the server, such that the server obtains the server storage path corresponding to the first resource identification and the location of the at least one multimedia resource within the designated document from the second preset database of the server, and sending to the terminal, the server saving path and the location of the at least one multimedia resource in the designated document;

sending the second resource request that carries the server's storage path to the server when the terminal receives the server storage path and the location of the at least one multimedia resource within the designated document, such that the server sends the at least one multimedia resource to the terminal according to an access of the server to the server storage path;

receiving the at least one multimedia resource by the terminal.

8. The method according to claim 1, wherein before the obtaining of the constituent information of the designated document, the method further comprising:

obtaining the designated document which comprises the at least one multimedia resource;

parsing the designated document to obtain the at least one multimedia resource;

saving the at least one multimedia resource to generate the constituent information of the designated document.

9. The method according to claim 8, wherein the parsing of the designated document to obtain the at least one multimedia resource, comprising:

parsing a portion corresponding to each paragraph of the designated document as a singular multimedia resource, utilizing the paragraph of the designated document as partitioning granularity in order to obtain the at least one multimedia resource.

10. The method according to claim 8, wherein the obtaining of the designated document comprising at least one of:

generating the designated document according to the at least one multimedia resource; or receiving the designated document uploaded by the terminal; or obtaining the designated document corresponding to a designated web link according to the designated web link; or obtaining the designated document sent by a contact.

11. The method according to claim 8, wherein the generating of the designated document according to the at least one multimedia resource, comprising:

obtaining the at least one multimedia resource;

determining a location of the at least one multimedia resource in the designated document according to an editing operation to the at least one multimedia resource;

generating the designated document according to the at least one multimedia resource and the location in the designated document.

12. The method according to claim 11, wherein obtaining of the at least one multimedia resource comprising:

providing an editing interface, wherein the editing interface is utilized to add to the at least one multimedia resource which constitutes the designated document;

obtaining the at least one multimedia resource which has been added via the editing interface by the user.

13. The method according to claim 11, wherein after generating the designated document according to the at least one multimedia resource and the location in the designated document, the method further comprising:

synchronizing the designated document with a server.

14. The method according to claim 13, wherein the synchronizing of the designated document with the server comprising one of:
- sending the designated document itself to the server such that the at least one multimedia resource in the designated document is parsed and stored by the server; or
- sending a characteristic value of the at least one multimedia resource in the designated document to the server;
- in the case if the at least one multimedia resource having the same characteristic value has already been stored in the server, sending multimedia resources other than those at least one multimedia resource which has already been storaged to the server; and
- in the case if the at least one multimedia resource having the same characteristic value has not been stored in the server, sending the at least one multimedia resource to the server.

15. The method according to claim 1, wherein after displaying the at least one multimedia resource in the designated document, the method further comprising:
- editing the designated document according to an editing operation to the designated document;
- sending the edited designated document to a server, such that the server parses and stores the edited designated document according to the at least one multimedia resource which constitutes the edited designated document.

16. The method according to claim 1, wherein the method further comprising:
- upon detecting a sliding operation to the pictures in the designated document, displaying one by one, pictures in the designated document according to the sliding operation.

17. The method according to claim 1, wherein the method further comprising:
- upon receiving a previewing command for any one of the at least one multimedia resources in the designated document, individually displaying the at least one multimedia resource corresponding to the previewing command.

18. The method according to claim 1, further comprising:
- upon receiving a command for reviewing all multimedia resources in the designated document, displaying entries which correspond to a stored designated document, wherein the entries comprise information associated with the designated document.

19. The method according to claim 1, further comprising:
- upon receiving a classification review command wherein the classification review command carries a designated multimedia resource type, displaying the designated multimedia resource type which has been stored in the designated document according to the designated multimedia resource type.

20. The method according to claim 1, further comprising:
- upon receiving a group review command wherein the group review command carries a source identification, displaying multimedia resource associated with the source identification which has been stored in the designated document according to the source identification.

21. The method according to claim 1, further comprising:
- upon receiving a storing command to any one of the at least one multimedia resources in the designated document, storing the at least one multimedia resource corresponding to the storing command according to a storing path as indicated by the storing command.

22. The method according to claim 1, further comprising:
- upon receiving a sending command for the designated document or any one of the at least one multimedia resources in the designated document, sending the at least one multimedia resource corresponding to the sending command to a subject as indicated by the sending command.

23. The method according to claim 22, further comprising one of:
- in case that the sending command carries a personal contact, sending the designated document or the at least one multimedia resource corresponding to the sending command to the personal contact; or
- in case that the sending command is a sharing command, sharing the designated document corresponding to the sending command or the first resource identification associated with the multimedia resource; or
- in case that the sending command is an uploading command, uploading the designated document corresponding to the sending command or the multimedia resource to a personal dynamic information display platform.

24. The method according to claim 1, further comprising:
- when displaying the at least one resource in the designated document, respectively displaying the at least one resource in a block format according to a type of the least one multimedia resource, wherein each multimedia resource corresponds to one block.

25. The method according to claim 1, wherein the operation request also carries identification of the designated document and/or designated account information.

26. The method according to claim 6, wherein the obtaining from the second preset database of the server, the server storage path corresponding to the first resource identification and the location of the at least one multimedia resource within the designated document according to the first resource identification of the at least one multimedia resource, comprising:
- obtaining the server storage path corresponding to a second resource identification from the second preset database of the server according to the first resource identification of the at least one multimedia resource;
- obtaining the location of the at least one multimedia resource in the designated document from a correspondence between the first resource identification and the identification of the designated document and/or correspondence between first resource identification and account information according to the first resource identification of the at least one multimedia resource; and
- obtaining the at least one multimedia resource based on the server storage path,
- wherein the second preset database stores mapping relationship among the first resource identification, server storage path and document.

27. An apparatus for process document, comprising at least a processor operating in conjunction with at least a memory which stores instruction codes operable to configure the apparatus to:
- upon receiving an operation request for a designated document wherein the operation request carries scene information, obtain constituents information of the designated document, wherein the constituents information comprises a first resource identification of at least one multimedia resource;

obtain according to the first resource identification of the at least one multimedia resource, the at least one multimedia resource and a location of the at least one multimedia resource within the designated document;

obtain the designated document according to the at least one multimedia resource and the location of the at least one multimedia resource within the designated document;

obtains document type corresponding to the scene information according to the scene information carried by the operation request;

generate the document type of the designated document according to the at least one multimedia resource and the location of the designated document;

generate a first document type of the designated document, wherein the first document type performs analysis based on preset logic, wherein the generating takes place when the scene information displays a scene and the document type is the first document type, and wherein the generating is according to the at least one multimedia resource and the location of the at least one multimedia resource within the designated document, and a compilation mode determined by the first document type; or generate a second document type of the designated document, wherein the second document type performs rich text editing, wherein the generating takes place when the scene information is an editing scene and the document type is the second document type, and wherein the generating is according to the at least one multimedia resource and the location of the at least one multimedia resource within the designated document, and a compilation mode determined by the second document type; and enhance a loading rate of the designated document, wherein the apparatus is configured to load and display in sequence, the at least one multimedia resource which constitutes the designated document according to a resource loading sequence which is determined by the designated document, such that the loading and displaying sequence enables the designated document starts being displayed without having to wait for a completion of loading and rendering of a whole document which the designated document being one of a plurality of documents or files within the whole document.

28. The apparatus of claim 27 is configured to:
prioritize loading and displaying of a first multimedia resource according to a prioritized loading information in the resource loading sequence, wherein the first multimedia resource corresponds to the prioritized loading information; and load and display a second multimedia resource according to common loading information in the resource loading sequence, wherein the second multimedia resource corresponds to the common loading information.

29. The apparatus of claim 27, wherein the operation request also carries information of a terminal and the apparatus is configured to:
obtain a document layout corresponding to the information of the terminal; and
adjust a location of the at least one multimedia resource within the designated document according to the document layout, and generate the designated document according to the adjusted location of the at least one multimedia resource.

30. The apparatus of claim 29, wherein:
upon receiving the operation request for the designated document, the terminal sends the operation request to a server, wherein the operation request carries an identification of the designated document, such that server upon receiving the operation request, obtains the constituent information of the designated document according to the identification of the designated document, and sends the constituent information to the terminal; and the apparatus receives the constituent information of the designated document.

31. The apparatus of claim 29, wherein:
upon receiving the operation request for the designated document which the operation request carries an identification of the designated document, the apparatus obtains the constituent information corresponding to the identification of the designated document from a local storage of a terminal according to the identification of the designated document.

32. The apparatus of claim 27 is configured to:
obtain from a first preset database of a terminal, a local storage path corresponding to the first resource identification and the location of the at least one multimedia resource in the designated document according to the first resource identification of the at least one multimedia resource, and obtaining the at least one multimedia resource based on the local storage path, wherein the first preset database stores a mapping relationship among the first resource identification, the local storage path and a document; and/or obtain from a second preset database of a server, a server storage path corresponding to the first resource identification and the location of the at least one multimedia resource within the designated document according to the first resource identification of the at least one multimedia resource, and obtain the at least one multimedia resource based on the server saving path, wherein the second preset database stores mapping relationship among the first resource identification, server saving path and document.

33. The apparatus of claim 32, wherein the apparatus is configured to:
send a first resource request that carries the resource identification of the at least one multimedia resource from the terminal to the server, such that the server obtains the server storage path corresponding to the first resource identification and the location of the at least one multimedia resource within the designated document from the second preset database of the server, and send to the terminal, the server saving path and the location of the at least one multimedia resource in the designated document;

send the second resource request that carries the server's storage path to the server when the terminal receives the server storage path and the location of the at least one multimedia resource within the designated document, such that the server sends the at least one multimedia resource to the terminal according to an access of the server to the server storage path; and receive the at least one multimedia resource by the terminal.

34. The apparatus of claim 27 is configured to:
obtain the designated document which comprises the at least one multimedia resource;
parse the designated document to obtain the at least one multimedia resource; and store the at least one multimedia resource to generate the constituent information of the designated document.

35. The apparatus of claim 34 is configured to parse a portion corresponding to each paragraph of the designated document as a singular multimedia resource, utilize the paragraph of the designated document as partitioning granularity in order to obtain the at least one multimedia resource.

36. The apparatus of claim 34 is configured to perform at least one of:
generate the designated document according to the at least one multimedia resource;
receive the designated document uploaded by the terminal;
obtain the designated document corresponding to a designated web link according to the designated web link; and
obtain the designated document sent by a contact.

37. The apparatus of claim 36 is configured to:
obtain the at least one multimedia resource;
determine a location of the at least one multimedia resource in the designated document according to an editing operation to the at least one multimedia resource; and
generate the designated document according to the at least one multimedia resource and the location in the designated document.

38. The apparatus of claim 37 is configured to provide an editing interface, wherein the editing interface is utilized to add to the at least one multimedia resource which constitutes the designated document; and obtain the at least one multimedia resource which has been added via the editing interface by the user.

39. The apparatus of claim 37 is configured to synchronize the designated document with a server.

40. The apparatus of claim 39 is configured to perform at least one of:
send the designated document itself to the server such that the at least one multimedia resource in the designated document is parsed and stored by the server; and
send a characteristic value of the at least one multimedia resource in the designated document to the server; wherein:
in the case if the at least one multimedia resource having the same characteristic value has already been stored in the server, the apparatus sends multimedia resources other than those at least one multimedia resource which has already been stored to the server; and
in the case if the at least one multimedia resource having the same characteristic value has not been stored in the server, the apparatus sends the at least one multimedia resource to the server.

41. The apparatus of claim 27 is configured to:
edit the designated document according to an editing operation to the designated document; and
send the edited designated document to a server, such that the server parses and stores the edited designated document according to the at least one multimedia resource which constitutes the edited designated document.

42. The apparatus of claim 27 is configured to:
upon detecting a sliding operation to the pictures in the designated document, display one by one, pictures in the designated document according to the sliding operation.

43. The apparatus of claim 27 is configured to:
upon receiving a previewing command for any one of the at least one multimedia resources in the designated document, individually display the at least one multimedia resource corresponding to the previewing command.

44. The apparatus of claim 27 is configured to perform one or more of:
upon receiving a classification review command wherein the classification review command carries a designated multimedia resource type, display the designated multimedia resource type which has been stored in the designated document according to the designated multimedia resource type;
upon receiving a group review command wherein the group review command carries a source identification, display multimedia resource associated with the source identification which has been stored in the designated document according to the source identification;
upon receiving a storing command to any one of the at least one multimedia resources in the designated document, store the at least one multimedia resource corresponding to the storing command according to a storing path as indicated by the storing command;
upon receiving a sending command for the designated document or any one of the at least one multimedia resources in the designated document, send the at least one multimedia resource corresponding to the sending command to a subject as indicated by the sending command; and
upon receiving a command for reviewing all multimedia resources in the designated document, display entries which correspond to a stored designated document, wherein the entries comprise information associated with the designated document.

45. The apparatus of claim 27 is configured to:
upon receiving a classification review command wherein the classification review command carries a designated multimedia resource type, display the designated multimedia resource type which has been stored in the designated document according to the designated multimedia resource type.

46. The apparatus of claim 27 is configured to:
a grouping displaying module, which upon receiving a group review command wherein the group review command carries a source identification, display multimedia resource associated with the source identification which has been stored in the designated document according to the source identification.

47. The apparatus of claim 27 is configured to:
upon receiving a storing command to any one of the at least one multimedia resources in the designated document, store the at least one multimedia resource corresponding to the storing command according to a storing path as indicated by the storing command.

48. The apparatus of claim 27 is configured to:
upon receiving a sending command for the designated document or any one of the at least one multimedia resources in the designated document, send the at least one multimedia resource corresponding to the sending command to a subject as indicated by the sending command.

49. The apparatus of claim 48 is configured to perform at least one of:
in case that the sending command carries a personal contact, send the designated document or the at least one multimedia resource corresponding to the sending command to the personal contact;

in case that the sending command is a sharing command, share the designated document corresponding to the sending command or the first resource identification associated with the multimedia resource; and in case that the sending command is an uploading command, upload the designated document corresponding to the sending command or the multimedia resource to a personal dynamic information display platform.

50. The apparatus of claim 27 is configured to when displaying the at least one resource in the designated document, respectively display the at least one resource in a block format according to a type of the least one multimedia resource, wherein each multimedia resource corresponds to one block.

51. The apparatus of claim 27, wherein the operation request also carries identification of the designated document and/or designated account information.

52. The apparatus of claim 32, wherein the operation request also carries identification of the designated document and/or designated account information, the apparatus is configured to:

obtain the server storage path corresponding to a second resource identification from the second preset database of the server according to the first resource identification of the at least one multimedia resource;

obtain the location of the at least one multimedia resource in the designated document from a correspondence between the first resource identification and the identification of the designated document and/or correspondence between first resource identification and account information according to the first resource identification of the at least one multimedia resource; and obtain the at least one multimedia resource based on the server storage path, wherein the second preset database stores mapping relationship among the first resource identification, server storage path and document.

* * * * *